US009753640B2

United States Patent
Yamashita

(10) Patent No.: US 9,753,640 B2
(45) Date of Patent: Sep. 5, 2017

(54) COMMUNICATION APPARATUS, CONTROL APPARATUS, METHOD OF CONTROLLING INPUT UNIT, AND MEDIUM

(71) Applicant: OKI DATA CORPORATION, Tokyo (JP)

(72) Inventor: Makoto Yamashita, Tokyo (JP)

(73) Assignee: OKI DATA CORPORATION, Tokyo (JP)

(*) Notice: Subject to any disclaimer, the term of this patent is extended or adjusted under 35 U.S.C. 154(b) by 267 days.

(21) Appl. No.: 14/540,158

(22) Filed: Nov. 13, 2014

(65) Prior Publication Data
US 2015/0138113 A1 May 21, 2015

(30) Foreign Application Priority Data
Nov. 15, 2013 (JP) ................ 2013-236377

(51) Int. Cl.
| | |
|---|---|
| G06F 3/0488 | (2013.01) |
| G06F 3/023 | (2006.01) |
| H04M 1/2745 | (2006.01) |
| H04M 1/725 | (2006.01) |

(52) U.S. Cl.
CPC ........ *G06F 3/04886* (2013.01); *G06F 3/0237* (2013.01); *H04M 1/274558* (2013.01); *H04M 1/72583* (2013.01)

(58) Field of Classification Search
CPC .............. G06F 3/0237; G06F 3/04886; H04M 1/274558; H04M 1/72583
USPC .......................................... 345/173
See application file for complete search history.

(56) References Cited

U.S. PATENT DOCUMENTS

2008/0082934 A1* 4/2008 Kocienda ............ G06F 3/04886
715/773
2011/0307822 A1* 12/2011 Park .................... G06F 3/04883
715/773

FOREIGN PATENT DOCUMENTS

| JP | H07-177216 A | 7/1995 |
|---|---|---|
| JP | 2000-78252 A | 3/2000 |
| JP | 2006-031518 A | 2/2006 |
| JP | 2009-267497 A | 11/2009 |

* cited by examiner

*Primary Examiner* — Dmitriy Bolotin
(74) *Attorney, Agent, or Firm* — Kubotera & Associates, LLC.

(57) ABSTRACT

A communication apparatus includes a display input unit having a display screen and an input unit for receiving an operation relative to the display screen; a control unit configured to control the display input unit so that destination information of a transmission destination is obtained; and a communication unit configured to transmit data to a destination specified with the destination information. The control unit displays a first key correlated to one letter on the display screen. The control unit displays a text input screen on the display screen so that the control unit receives an operation of inputting one letter when the control unit receives an operation of specifying the first key. The control unit obtains a text string formed of the one letter correlated to the first key thus specified and the one letter thus input as the destination information.

17 Claims, 24 Drawing Sheets

501

| ONE-TOUCH DIAL | NAME | NUMBER |
|---|---|---|
| 0 0 0 | 0 0 | 0 0 |
| 0 0 1 | X x x | 0 1 2 0 - 3 4 5 6 - 7 8 9 0 |
| 0 0 2 | Y y y | 0 0 1 - 2 3 4 - 6 7 8 9 |
| 0 0 3 | Z z z | 0 1 - 2 2 2 - 3 3 3 3 |
| 0 0 4 | A a | 0 0 2 - 3 3 4 4 - 5 5 6 6 |
| 0 0 5 | B b | 0 1 - 4 4 4 - 5 5 5 5 |
| ... | ... | ... |

FIG. 5

COMMUNICATION APPARATUS, CONTROL APPARATUS, METHOD OF CONTROLLING INPUT UNIT, AND MEDIUM

BACKGROUND OF THE INVENTION AND RELATED ART STATEMENT

The present invention relates to a communication apparatus, a control apparatus, a method of controlling an input unit, and a medium. More specifically, the present invention relates to a communication apparatus, a control apparatus, a method of controlling an input unit, and a non-transitory computer readable medium storing a program for controlling an input unit. A non-transitory computer readable medium includes a hard drive, a compact disc, a flash memory, a volatile memory, and the like, but does not include a transitory signal per se.

A conventional communication apparatus may include a touch panel, so that a key pad is displayed on the touch panel for inputting destination information such as a telephone number.

Patent Reference has disclosed a conventional mobile telephone. In the conventional mobile telephone disclosed in Patent Reference, it is configured to hold an identification mark indicating a current operation state (for example, a normal idling state and a call receiving state). The conventional mobile telephone includes a display having a touch panel, so that a key name corresponding to the operation state indicated with the identification mark is displayed on the display. When the key name is operated, an operational command corresponding to the key name is performed. Further, it is configured to update the identification mark, thereby improving operability.

Patent Reference: Japanese Patent Publication No. 2000-78252

In the conventional communication apparatus disclosed in Patent Reference, when the display screen is operated to input the destination information, a text input screen such as a ten-key screen is displayed on the display screen from the beginning. Accordingly, even when the text input screen is not necessary, the text input screen occupies a certain area of the display screen, thereby lowering utility efficiency of the display screen.

In the conventional communication apparatus disclosed in Patent Reference, it may be configured such that a specific key is provided for displaying the text input screen. However, in this configuration, it is necessary to perform one additional step for displaying the text input screen, thereby lowering operational efficiency of the conventional communication apparatus.

An object of the present invention is to provide a communication apparatus, a control apparatus, a method of controlling an input unit, and a medium capable of improving utility efficiency and operational efficiency of a display screen when the destination information is obtained.

Further objects and advantages of the invention will be apparent from the following description of the invention.

SUMMARY OF THE INVENTION

In order to attain the objects described above, according to an aspect of the present invention, a communication apparatus includes a display input unit including a display unit having a display screen and an input unit for receiving an operation relative to the display screen; a control unit configured to control the display input unit so that destination information of a transmission destination is obtained; and a communication unit configured to transmit data to a destination specified with the destination information of the transmission destination thus obtained.

According to the aspect of the present invention, the control unit is configured to control the display input unit to display a first key correlated to at least one letter specified in advance on the display screen. Further, the control unit is configured to control the display input unit to display a text input screen on the display screen so that the control unit receives an operation of inputting at least one letter relative to the text input screen when the control unit receives an operation of specifying the first key. Further, the control unit is configured to obtain a text string formed of the at least one letter correlated to the first key thus specified and the at least one letter thus input as the destination information of the transmission destination.

According to the present invention, it is possible to provide a communication apparatus, a control apparatus, a method of controlling an input unit, and a medium capable of improving utility efficiency and operational efficiency of the display screen when the destination information is obtained.

BRIEF DESCRIPTION OF THE DRAWINGS

FIG. 5 is a schematic view showing a destination information table stored in a destination information storage unit of the communication apparatus according to the first embodiment of the present invention;

DETAILED DESCRIPTION OF PREFERRED EMBODIMENTS

Hereunder, embodiments of the present invention will be explained with reference to the accompanying drawings. It should be noted that the present invention is not limited to the accompanying drawings, and the embodiments can be modified within a scope of the present invention.

First Embodiment

Figure 1:
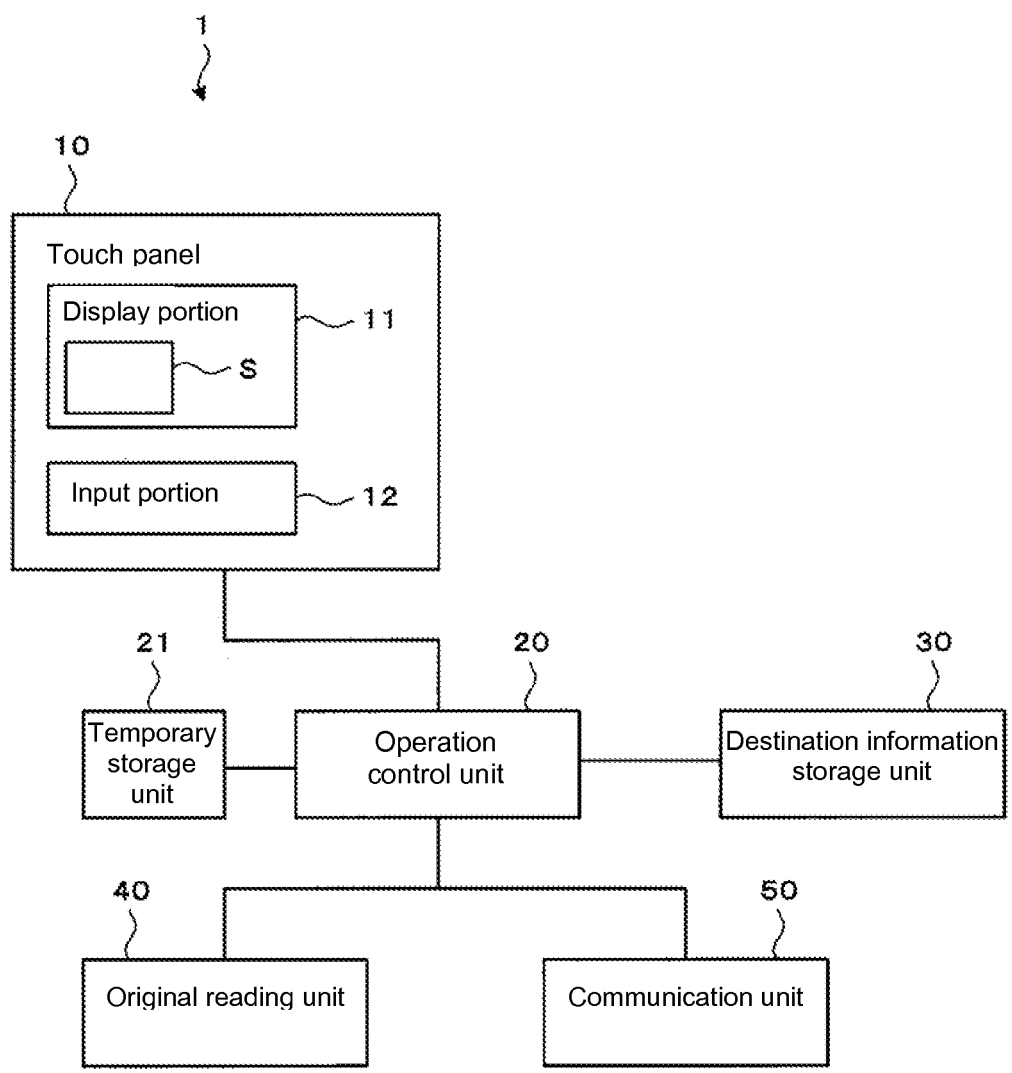
FIG. 1 is a block diagram showing a configuration of a communication apparatus according to a first embodiment of the present invention.

A first embodiment of the present invention will be explained. FIG. 1 is a block diagram showing a configuration of a communication apparatus 1 according to the first embodiment of the present invention.

In the first embodiment, the communication apparatus 1 is configured to obtain destination information of a transmission destination, and to transmit data to the transmission destination specified with the destination information. More specifically, the communication apparatus 1 is a facsimile.

As shown in FIG. 1, the communication apparatus 1 includes a touch panel 10; an operation control unit 20; a destination information storage unit 30; an original reading unit 40; and a communication unit 50.

In the first embodiment, the touch panel 10 includes a display portion 11 having a display screen S and an input portion 12 for receiving an operation relative to the display screen S. When the display portion 11 receives screen data from the operation control unit 20, the display portion 11 displays the screen data on the display screen S. The input portion 12 is configured to detect a position on the display screen S where an operator touches or pushes, and transmit a detection result to the operation control unit 20. The input portion 2 may be a resistive film type formed of a resistor film for detecting the position.

In the first embodiment, the operation control unit 20 is configured to control the touch panel 10 to receive an operation relative to the display screen S. Further, based on the operation, the operation control unit 20 is configured to control an operation of the communication apparatus 1. More specifically, the operation control unit 20 generates the screen data and transmits the screen data to the display portion 11, so that an input screen is displayed on the display screen S. Accordingly, the operation control unit 20 receives an input of an operator relative to the input screen, and transmits an operation instruction to the destination information storage unit 30, the original reading unit 40, and the communication unit 50 according to the input. In particular, the operation control unit 20 is configured to control the touch panel 10 to obtain the destination information of the transmission destination. More specifically, the operation control unit 20 receives the destination information of the transmission destination through the touch panel 10, and stores the destination information of the transmission destination in a storage unit (a temporary storage unit) 21. It should be noted that the destination information of the transmission destination specifies the transmission destination of the communication unit 50, and may be a destination telephone number (referred to as a destination number).

In the first embodiment, the destination information storage unit 30 is configured to store information such as the destination information to be used in a process performed with the operation control unit 20. Further, the destination information storage unit 30 may include a storage device of a non-volatile type such as a hard disk device and a flash memory.

In the first embodiment, the original reading unit 40 is configured to read an original to generate image data. For example, the original reading unit 40 may include a scanner for optically reading an image of the original and generating the image data of the original.

In the first embodiment, the communication unit 50 is configured to transmit data as a transmission subject to the transmission destination specified by the destination information of the transmission destination. More specifically, the communication unit 50 controls a facsimile transmission operation, so that the communication unit 50 transmits the image data generated by the original reading unit 40 to the destination number obtained by the operation control unit 20.

Figure 2:
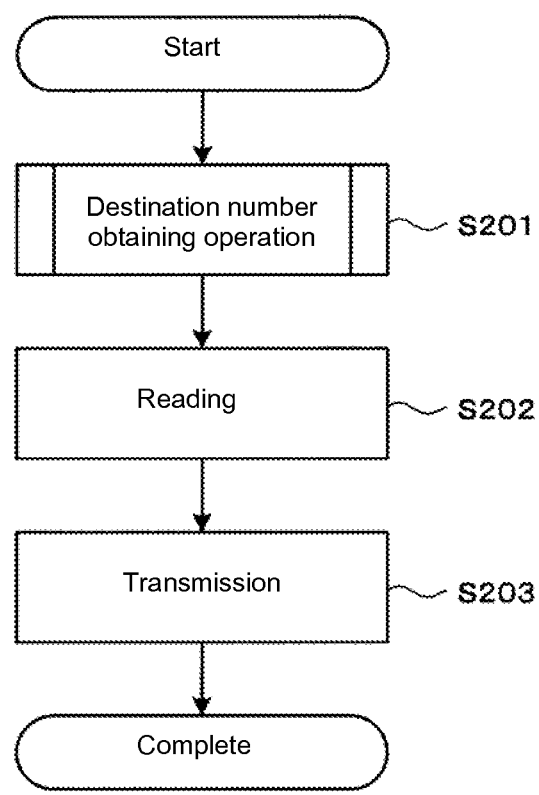
FIG. 2 is a flow chart showing a transmission operation of the communication apparatus according to the first embodiment of the present invention.
Figure 3:
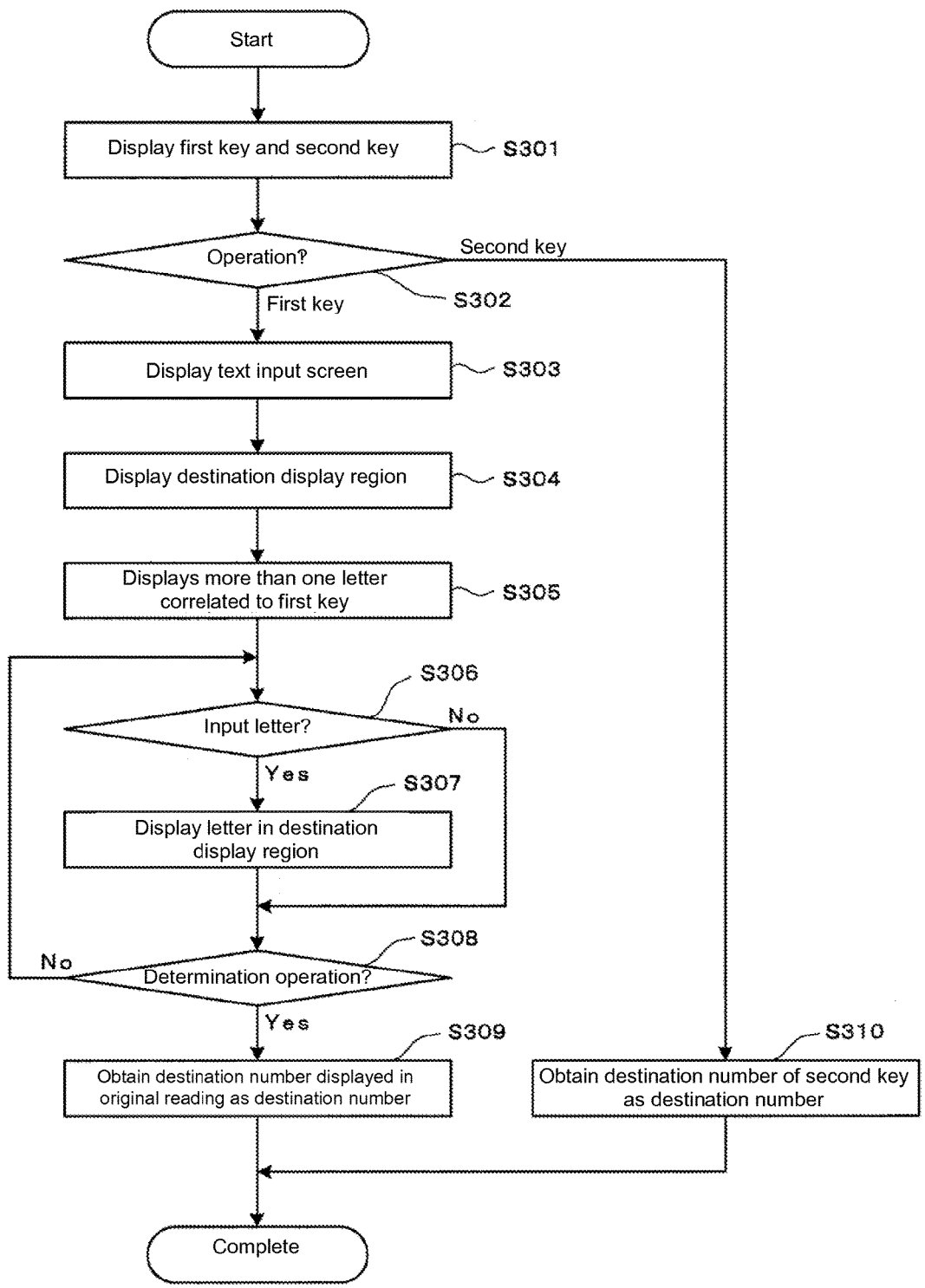
FIG. 3 is a flow chart showing a destination number obtaining operation of the communication apparatus in step S201 shown in FIG. 2 according to the first embodiment of the present invention.
Figure 4:
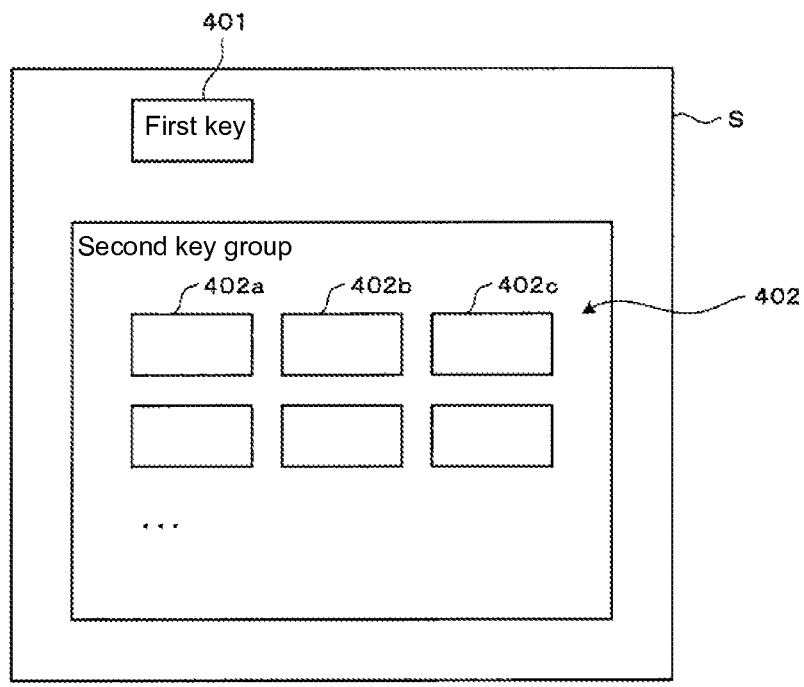
FIGS. 4(a) and 4(b) are schematic views showing a screen displayed on a display screen of a touch panel of the communication apparatus according to the first embodiment of the present invention.
Figure 4:
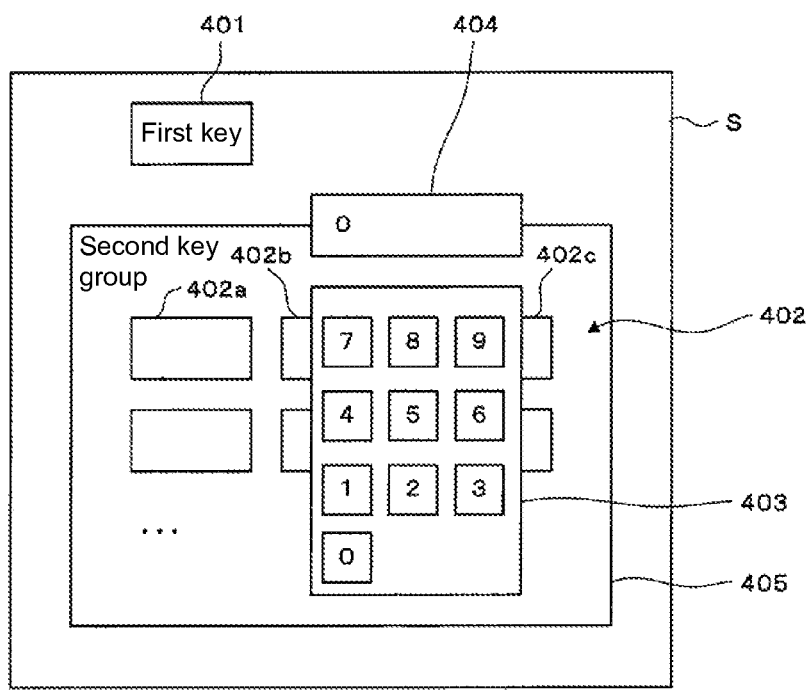

FIG. 2 is a flow chart showing a transmission operation of the communication apparatus 1 according to the first embodiment of the present invention. FIG. 3 is a flow chart showing a destination number obtaining operation of the communication apparatus 1 in step S201 shown in FIG. 2 according to the first embodiment of the present invention. FIGS. 4(a) and 4(b) are schematic views showing a screen displayed on the display screen S of the touch panel 10 of the communication apparatus 1 according to the first embodiment of the present invention. In the following description, a function and an operation of the communication apparatus 1 will be explained with reference to FIGS. 2 to 4(a)-4(b).

As shown in FIG. 2, in step S201, the operation control unit 20 performs the destination number obtaining operation. Accordingly, the operation control unit 20 obtains the destination number of the transmission destination through the touch panel 10, and stores the destination number of the transmission destination in, for example, the storage unit 21. It should be noted that the destination number obtaining operation will be explained in more detail with reference to FIG. 3.

In step S202, the operation control unit 20 instructs the original reading unit 40 to read the original. According to the instruction, the original reading unit 40 reads the original and generates the image data.

In step S203, the operation control unit 20 transmits the image data generated by the original reading unit 40 along with the destination number of the transmission destination obtained in step S201 (for example, the destination number stored in the storage unit 21) to the communication unit 50. Further, the operation control unit 20 instructs the communication unit 50 to transmit the image data to the destination number of the transmission destination. Accordingly, the communication unit 50 transmits the image data to the destination number of the transmission destination through the facsimile transmission operation.

As shown in FIG. 3, in the destination number obtaining operation, in step S301, the operation control unit 20 displays a first key 401 and a second key group 402 on the display screen S of the touch panel 10 as shown in FIG. 4(a).

In the first embodiment, the first key 401 is correlated to at least one letter specified in advance. More specifically, the first key 401 is correlated to a text string formed of at least one letter constituting a portion of the destination number (for example, a first portion of the destination number). For example, the text string may be a number string formed of at least one number, and may include a text such as hyphen dividing numbers. The correlation between the first key 401 and at least one letter is stored in the destination information storage unit 30.

In the embodiment, the second key group 402 includes more than one second keys 402a, 402b, 402c, and the like. The second keys 402a, 402b, 402c, and the like are correlated to the destination numbers each specified in advance. It should be noted that the destination numbers are number strings formed of a plurality of numbers, may include a text such as hyphen dividing numbers. The correlation between the second keys 402a, 402b, 402c, and the like contained in the second key group 402 and the destination numbers is stored in the destination information storage unit 30.

In step S302, the operation control unit 20 determines whether the operation control unit 20 receives the operation relative to the display screen S. When the operation control unit 20 receives the operation of specifying the first key 401 in step S302, the operation control unit 20 displays a text input screen 403 on the display screen S, so that the operation control unit 20 receives the operation of inputting at least one letter relative to the text input screen. Accordingly, the operation control unit 20 obtains the text string formed of at least one letter correlated to the first key 401 and at least one letter thus input as the destination number of the transmission destination. For example, through the text input screen 403, the operation control unit 20 receives an input of a text string formed of at least one letter constituting a remaining portion (for example, a rear portion) of the destination number. Then, the operation control unit 20 obtains the text string formed of the text string correlated to the first key 401 and the text string thus input as the destination number of the transmission destination.

More specifically, in step S303, as shown in FIG. 4(b), the operation control unit 20 displays the text input screen 403 on the display screen S. For example, when the operation control unit 20 receives the operation of specifying the first key 401, the operation control unit 20 starts displaying the text input screen 403 on the display screen S. Alternatively, the operation control unit 20 does not display the text input screen 403 on the display screen S until the first key 401 is specified. Then, when the first key 401 is specified, the operation control unit 20 displays the text input screen 403 on the display screen S. The text input screen 403 includes a plurality of text keys for inputting a text. For example, the text input screen 403 may include a ten-key screen having a plurality of number keys for inputting a number.

In step S304, as shown in FIG. 4(b), the operation control unit 20 displays a destination display region (or a destination input column) 404 on the display screen S. For example, when the operation control unit 20 receives the operation of specifying the first key 401, the operation control unit 20 starts displaying the original reading unit 404 on the display screen S. Alternatively, the operation control unit 20 does not display the original reading unit 404 on the display screen S until the first key 401 is specified. Then, when the first key 401 is specified, the operation control unit 20 displays the original reading unit 404 on the display screen S. The destination display region 404 is provided for displaying the number or the text string already input.

In step S305, the operation control unit 20 refers to the destination information storage unit 30, and displays at least one letter correlated to the first key 401 thus specified. As shown in FIG. 4(b), "0" is displayed as the one letter correlated to the first key 401.

In step S306, the operation control unit 20 determines whether the operation control unit 20 receives the operation of inputting a letter relative to the text input screen 403. In step S307, when the operation control unit 20 determines that the operation control unit 20 receives the operation of inputting a letter (Yes in step S306), the operation control unit 20 displays the letter thus input in the original reading unit 404, and the process proceeds to step S308. On the other hand, when the operation control unit 20 determines that the operation control unit 20 does not receive the operation of inputting a letter (No in step S306), the operation control unit 20 does not perform step S307, and the process proceeds to step S308.

In step S308, the operation control unit 20 determines whether the operation control unit 20 receives a specific determination operation. The specific determination operation may include an operation of specifying a specific key (for example, a transmission key) displayed on the display screen S. When the operation control unit 20 determines that the operation control unit 20 does not receive the specific determination operation (No in step S308), the process returns to step S306. When the operation control unit 20 determines that the operation control unit 20 receives the specific determination operation (Yes in step S308), the process proceeds to step S309. Accordingly, through the process described above, every time when the operation control unit 20 receives the operation of inputting the letter relative to the text input screen 403, the operation control unit 20 displays the letter thus input in the original reading unit 404. Further, when the operation control unit 20 determines that the operation control unit 20 receives the specific determination operation, the process proceeds to step S309.

In step S309, the operation control unit 20 obtains the test string displayed in the original reading unit 404 at this moment as the destination number of the transmission destination, thereby completing the process. For example, the operation control unit 20 obtains the destination number displayed in the original reading unit 404 as the destination number of the transmission destination, and stores the destination number in the storage unit 21.

In step S310, when the operation control unit 20 receives the operation of specifying one of the second keys of the second key group 402 in step S302, the operation control unit 20 refers to the destination information storage unit 30. Further, the operation control unit 20 obtains the destination number correlated to the one of the second keys as the destination number of the transmission destination, thereby completing the process. For example, the operation control unit 20 stores the destination number correlated to the one of the second keys in the storage unit 21.

In the first embodiment, the information stored in the destination information storage unit 30 is registered through, for example, an input of the operator. In this case, the operation control unit 20 receives the operation of inputting at least one letter relative to the first key 401 through the touch panel 10. Then, the operation control unit 20 registers at least one letter thus input in the destination information storage unit 30 such that at least one letter is correlated to the first key 401. Further, the operation control unit 20 receives the operation of selecting one of the second keys to set the destination number through the touch panel 10. Then, the operation control unit 20 registers the destination number in the destination information storage unit 30 such that the destination number is correlated to the one of the second keys.

As shown in FIG. 4(b), the operation control unit 20 displays the text input screen 403 such that the text input screen 403 is overlapped with a screen 405 where one than one second keys are arranged (or the second key group 402). More specifically, the operation control unit 20 displays the text input screen 403 at a location where at least a part of each of the second keys arranged in the screen 405 becomes visible. In the example shown in FIG. 4(b), all of the second keys, which are displayed before the text input screen 403 is displayed, are arranged in the screen 405. It may be configured such that the screen 405 includes the second keys in a different number from that thereof before the text input screen 403 is displayed. For example, it may be configured such that the screen 405 includes the second keys in a smaller number from that thereof before the text input screen 403 is displayed.

In the first embodiment, it may be configured such that the operation control unit 20 displays the text input screen 403 at a location where the operator can change. For example, when the operation control unit 20 receives an operation of setting the display location of the text input screen 403 on the display screen S, the operation control unit 20 displays the text input screen 403 at the display location thus set.

Next, the communication apparatus 1 will be explained in more detail with reference to FIGS. 5 to 14. In the first embodiment, the communication apparatus 1 includes a plurality of one-touch keys. One of the one-touch keys is configured to function as the first key, and the rest of the one-touch keys are configured to function as the second keys.

FIG. 5 is a schematic view showing a destination information table 501 stored in the destination information storage unit 30 of the communication apparatus 1 according to the first embodiment of the present invention.

As shown in FIG. 5, the destination information table 501 includes specific one-touch numbers assigned to each of the one-touch keys; destination names corresponding to the one-touch keys; and destination numbers corresponding to the one-touch keys in such a manner that the one-touch numbers, the destination names, and the destination numbers are mutually correlated per one-touch key. In other words, the destination information table 501 includes a plurality of records, and each of the records is formed of the three fields such as the one-touch number, the destination name, and the destination number. The specific one-touch number assigned to each of the one-touch keys is stored in the one-touch number field. The destination name is stored in the destination name field. The destination number is stored as the telephone number of the transmission destination in the destination number field. In the first embodiment, the one-touch key "000" is used as the first key, and the one-touch keys "001" and after are used as the second keys.

Figure 6:
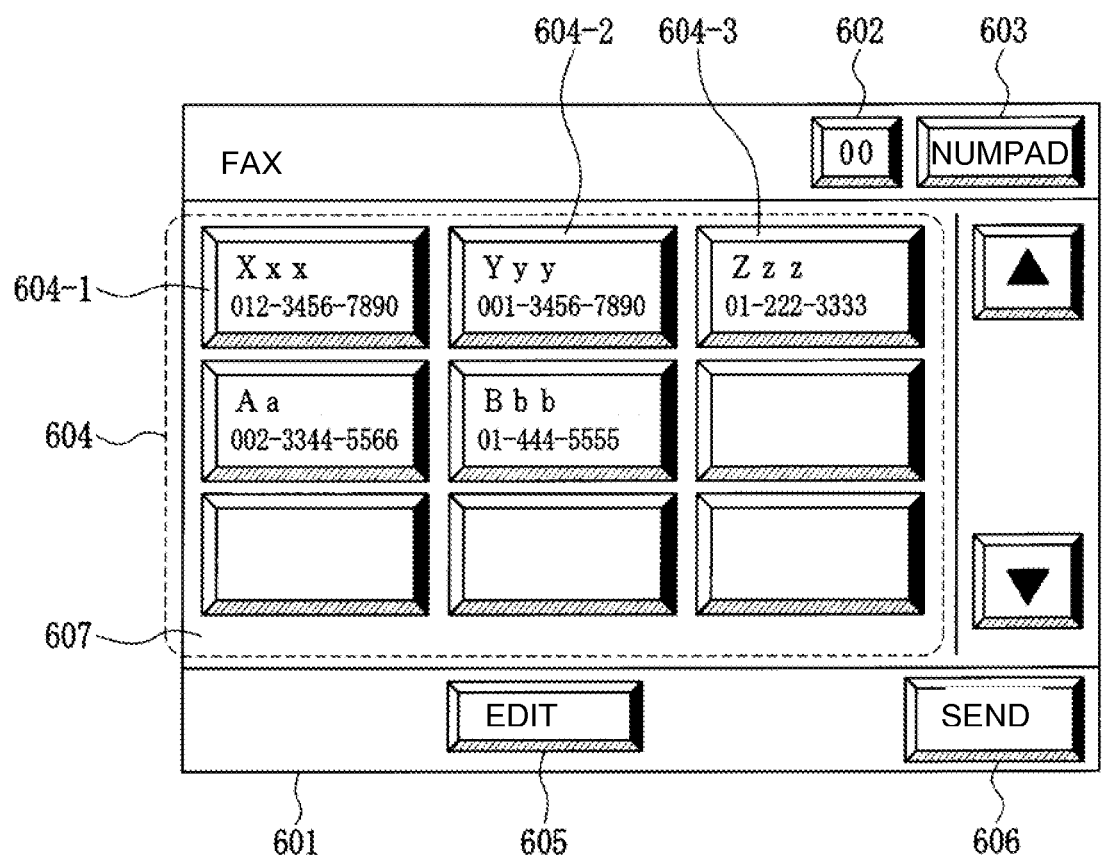
FIG. 6 is a schematic view showing a facsimile transmission screen displayed on the display screen of the touch panel of the communication apparatus according to the first embodiment of the present invention.

FIGS. 6 to 11 are views showing examples of screens to be displayed on the display screen S of the touch panel 10. FIG. 6 is a schematic view showing a facsimile transmission screen 601 displayed on the display screen S of the touch panel 10 of the communication apparatus 1 according to the first embodiment of the present invention As shown in FIG. 6, the facsimile transmission screen 601 includes a one-touch key 602; a ten-key display instruction key 603; a one-touch key group 604; a destination editing key 605; and a transmission key 606. The one-touch key 601 has the one-touch number "000" and corresponds to the first key. More specifically, the one-touch number "000" as the destination name or the destination number corresponding to the one-touch key is displayed in the one-touch key 602.

In the first embodiment, the ten-key display instruction key 603 is provided for displaying an input panel 1102 (described later) as the text input screen. The one-touch key group 604 includes the one-touch keys 604-1, 604-2, 604-3, and the like having the one-touch number "001" and after, and corresponding to the second keys. More specifically, the destination name and the destination number corresponding to the one-touch key are displayed in each of the one-touch keys 604-1, 604-2, 604-3, and the like of the one-touch key 602. It is configured such that the one-touch key group 604 is displayed in a visually different design from that of the one-touch key 602. For example, the one-touch key group 604 is displayed in a screen (for example, a scrollable screen) 607 different from the one-touch key 602.

In the first embodiment, the destination editing key 605 is provided for displaying a destination editing screen 801 (described later). The transmission key 606 is provided for starting a transmission.

Figure 7:
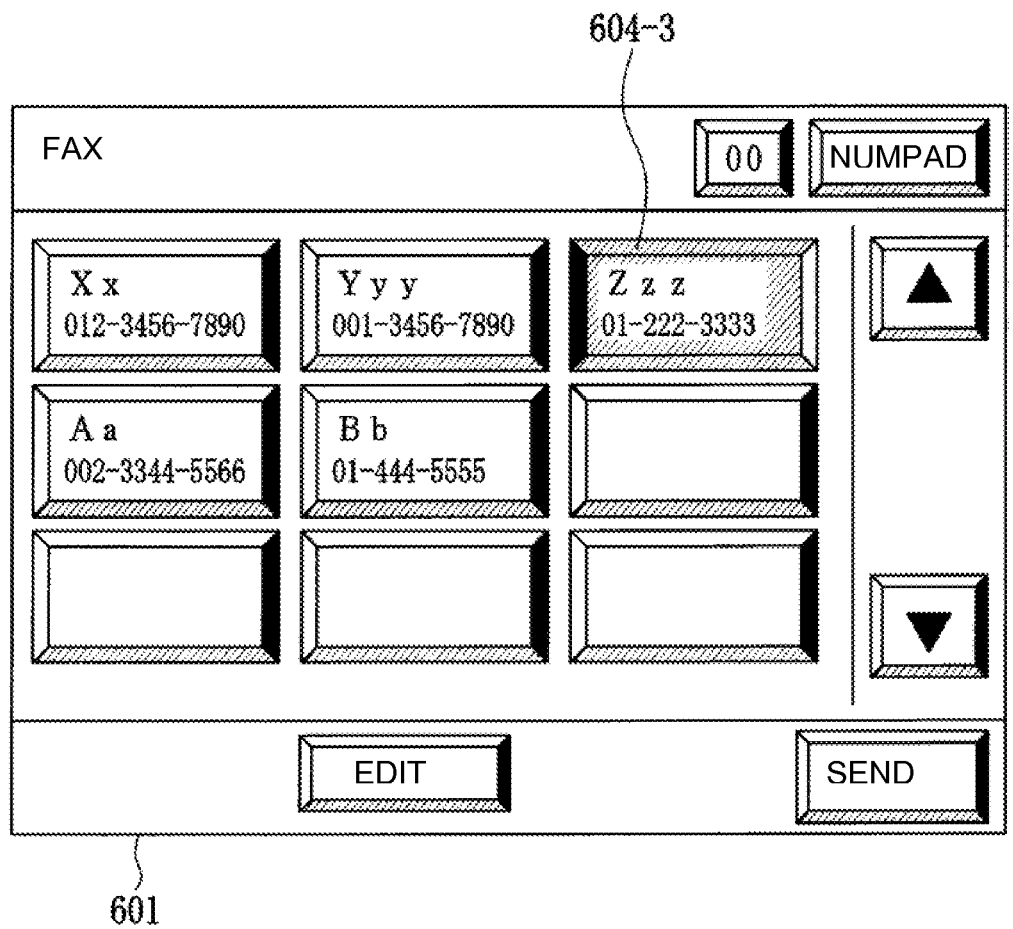
FIG. 7 is a schematic view showing an example No. 1 of the facsimile transmission screen displayed on the display screen of the touch panel of the communication apparatus when a one-touch key of a one-touch number "003" is pushed down according to the first embodiment of the present invention.

FIG. 7 is a schematic view showing an example No. 1 of the facsimile transmission screen 601 displayed on the display screen S of the touch panel 10 of the communication apparatus 1 when the one-touch key 604-3 having the one-touch number "003" is pushed down according to the first embodiment of the present invention.

As shown in FIG. 7, the one-touch key 604-3 having the one-touch number "003" is displayed in a state indicating that the one-touch key 604-3 is pushed down. More specifically, the one-touch key 604-3 is displayed such that a key shape of the one-touch key 604-3 is visually depressed.

Figure 8:
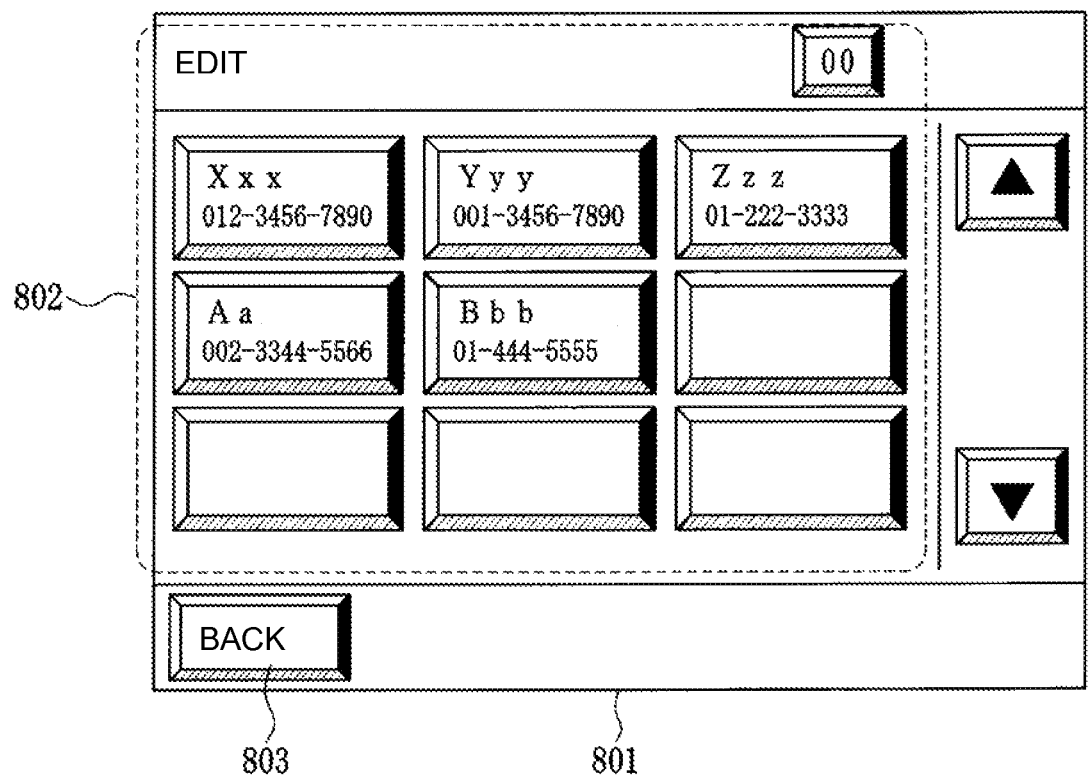
FIG. 8 is a schematic view showing a destination editing screen displayed on the display screen of the touch panel of the communication apparatus according to the first embodiment of the present invention.

FIG. 8 is a schematic view showing the destination editing screen 801 displayed on the display screen S of the touch panel 10 of the communication apparatus 1 according to the first embodiment of the present invention.

As shown in FIG. 8, the destination editing screen 801 includes a one-touch key group 802 and a return key 803. The one-touch key group 802 includes the one-touch keys to become a subject to editing. More specifically, the one-touch key group 802 includes the one-touch key having the one-touch number "000" and the one-touch keys having the one-touch numbers "001" and after. The return key 803 is provided for returning to the facsimile transmission screen 601.

Figure 9:
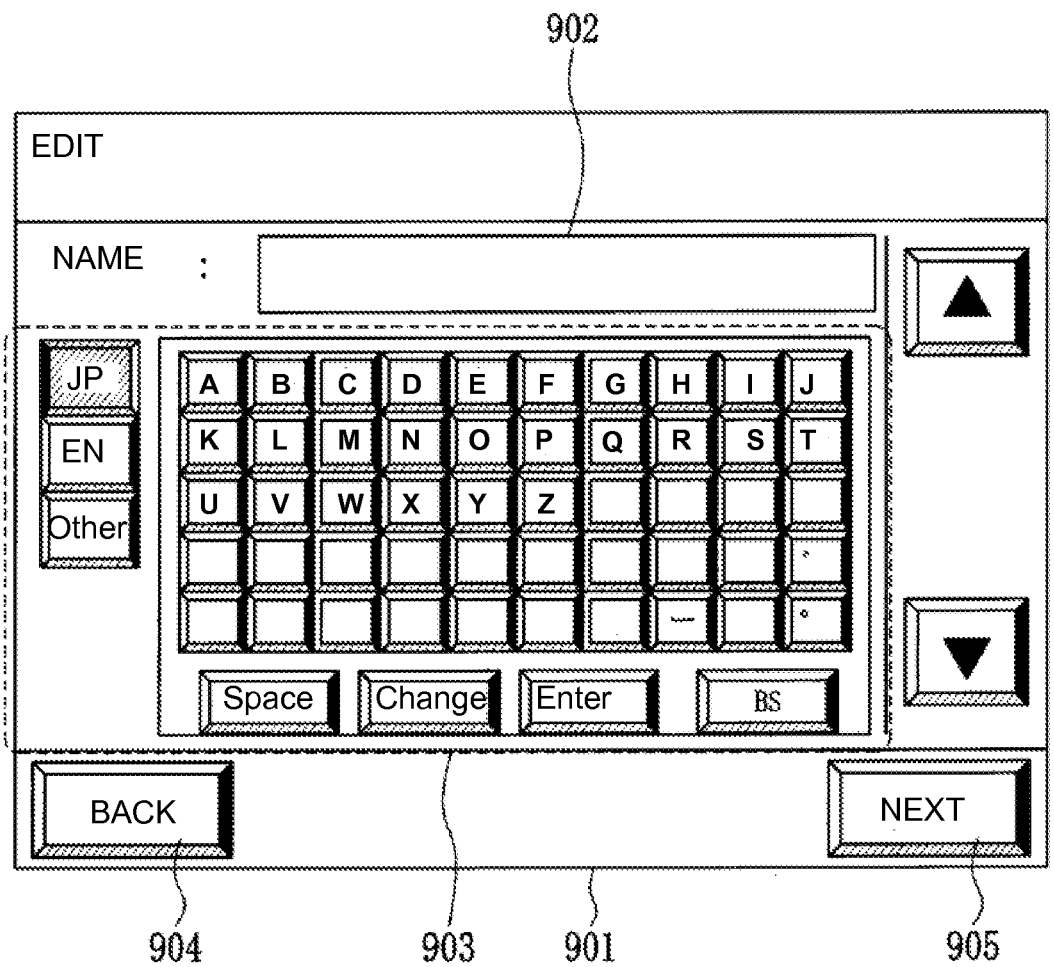
FIG. 9 is a schematic view showing a destination name editing screen displayed on the display screen of the touch panel of the communication apparatus according to the first embodiment of the present invention.

FIG. 9 is a schematic view showing a destination name editing screen 901 displayed on the display screen S of the touch panel 10 of the communication apparatus 1 according to the first embodiment of the present invention.

As shown in FIG. 9, the destination name editing screen 901 includes a destination name displaying region (or a destination name inputting column) 902; a soft keyboard 903; a return key 904; and a next key 905. The destination name displaying region 902 displays the text string (or the destination name) input through the soft keyboard 903. The soft keyboard 903 includes various letter keys and various control keys for controlling text input. The return key 904 is provided for returning to the destination editing screen 801 after edited contents are discarded. The next key 905 is provided for confirming the displayed contents of the destination name displaying region 902 as the destination name, and proceeding to a destination number editing screen 1001.

Figure 10:
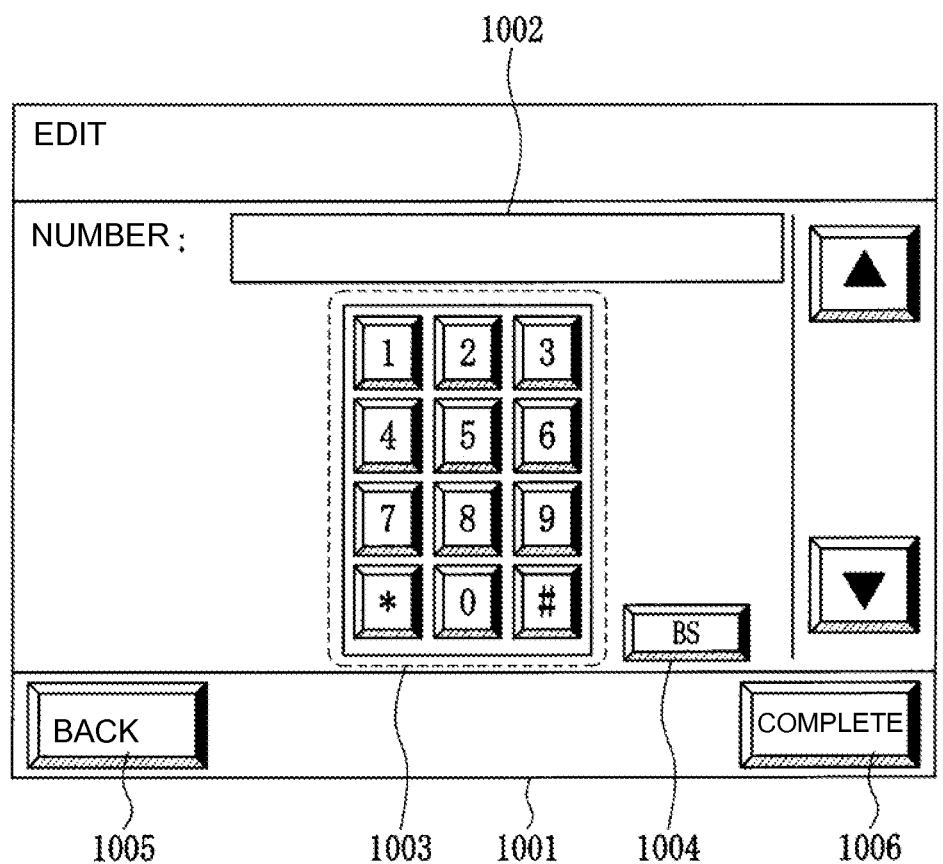
FIG. 10 is a schematic view showing a destination number editing screen displayed on the display screen of the touch panel of the communication apparatus according to the first embodiment of the present invention.

FIG. 10 is a schematic view showing the destination number editing screen 1001 displayed on the display screen S of the touch panel 10 of the communication apparatus 1 according to the first embodiment of the present invention.

As shown in FIG. 10, the destination number editing screen 1001 includes a destination number display region (or a destination number input column) 1002; a ten-key 1003; a back space key (or a BS key) 1004; a return key 1005; and a completion key 1006. The destination number display region 1002 displays the text string (or the destination number) input through the ten-key 1003. The ten-key 1003 includes number keys from "0" to "9", an asterisk "*" key; and a sharp "#" key. The back space key 1004 is provided for deleting one letter input through the ten-key 1003. The return key 1005 is provided for returning to the destination name editing screen 901 after edited contents are discarded. The completion key 1006 is provided for confirming the displayed contents of the destination number display region 1002 as the destination number.

Figure 11:
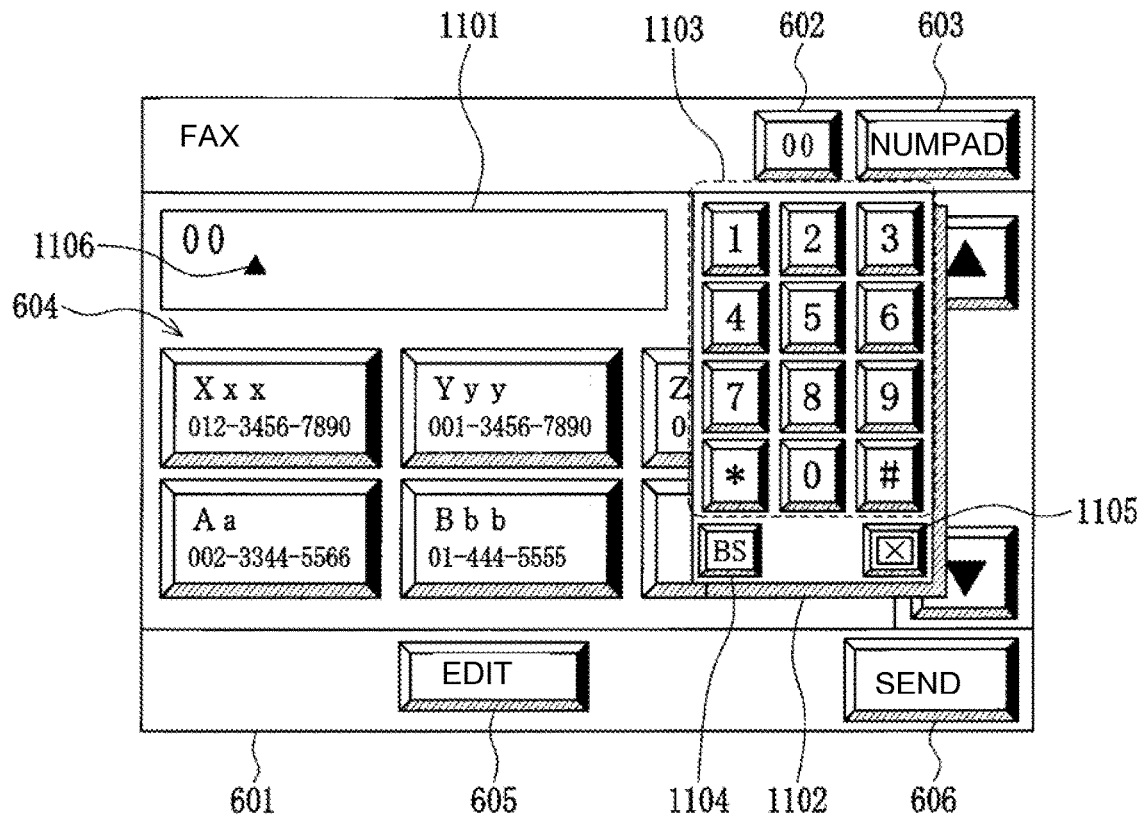
FIG. 11 is a schematic view showing an example No. 2 of the facsimile transmission screen displayed on the display screen of the touch panel of the communication apparatus when a one-touch key of a one-touch number "000" is pushed down according to the first embodiment of the present invention.

FIG. 11 is a schematic view showing an example No. 2 of the facsimile transmission screen 601 displayed on the display screen S of the touch panel 10 of the communication apparatus 1 when the one-touch key 602 having the one-touch number "000" is pushed down according to the first embodiment of the present invention.

As shown in FIG. 11, in addition to the one-touch key 602, the ten-key display instruction key 603, the one-touch key group 604, the destination editing key 605, and the transmission key 606, the facsimile transmission screen 601 further includes a destination display region (or a destination input column) 1101 and an input panel 1102. The destination display region 1101 displays the text string (or the destination number) input through the input panel 1102. The input panel 1102 includes a ten-key 1103; a back space key (or a BS key) 1104; and a close key 1105. The ten-key 1103 includes number keys from "0" to "9", an asterisk "*" key; and a sharp "#" key. The back space key 1104 is provided for deleting one letter input through the ten-key 1103. The return key 1005 is provided for returning to the destination name editing screen 901 after edited contents are discarded. The close key 1105 is provided for closing the input panel 1102. Further, the destination display region 1101 includes a cursor 1106 for indicating an input position of the destination number.

Figure 12:
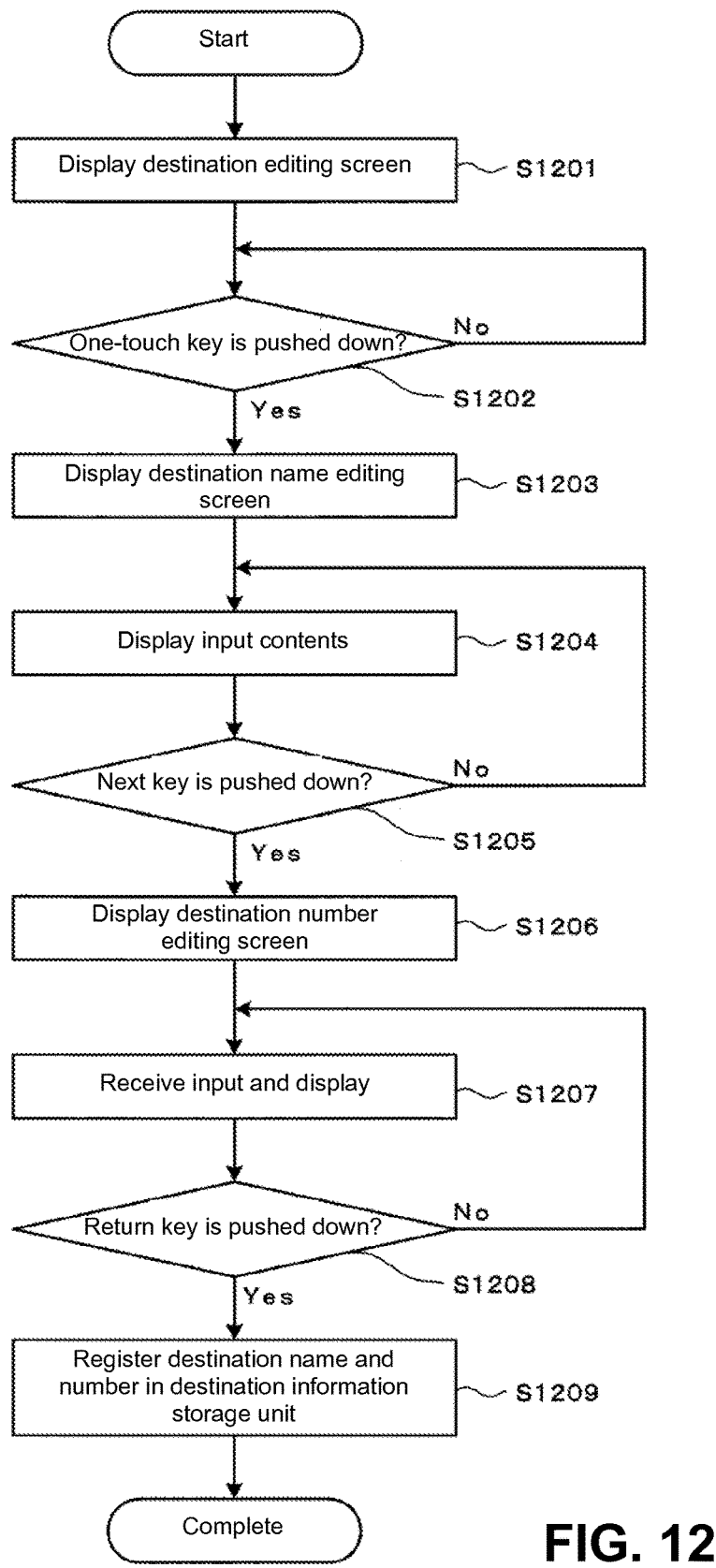
FIG. 12 is a flow chart showing a destination editing operation of the communication apparatus according to the first embodiment of the present invention.

An operation of the operation control unit 20 will be explained next with reference to flow charts shown in FIGS. 12 to 14. FIG. 12 is a flow chart showing a destination editing operation of the communication apparatus 1 for editing the destination information table 501 according to the first embodiment of the present invention.

In step S1201, when the destination editing key 605 is pushed down in the facsimile transmission screen 601, the operation control unit 20 displays the destination editing screen 801.

In step S1202, the operation control unit 20 determines whether one of the out-touch keys in the one-touch key group 802 of the communication apparatus 1 is pushed down. In step S1203, when the operation control unit 20 determines that one of the out-touch keys in the one-touch key group 802 of the communication apparatus 1 is pushed down (Yes in step S1202), the operation control unit 20 displays the destination name editing screen 901.

In step S1204, when the operation control unit 20 receives the input operation relative to the soft keyboard 903 in the destination name editing screen 901, the operation control unit 20 displays the input contents thus input thorough the input operation in the destination name displaying region 902.

In step S1205, the operation control unit 20 determines whether the next key 905 in the destination name editing screen 901 is pushed down. In step S1206, when the operation control unit 20 determines that the next key 905 in the destination name editing screen 901 is pushed down, the operation control unit 20 displays the destination number editing screen 1001.

In step S1207, when the operation control unit 20 receives the input operation relative to the ten-key 1003 in the destination number editing screen 1001, the operation control unit 20 displays the input contents thus input thorough the input operation in the destination number display region 1002.

In step S1208, the operation control unit 20 determines whether the return key 1005 in the destination number editing screen 1001 is pushed down. In step S1209, when the operation control unit 20 determines that the return key 1005 in the destination number editing screen 1001 is pushed down, the operation control unit 20 correlates the destination name input in step S1204 (that is, the text string displayed in the destination name displaying region 902 when the next key 905 is pushed down) and the destination number input in step S1207 (that is, the text string displayed in the destination number display region 1002 when the return key 1005 is pushed down) to the one-touch number of the one-touch key selected in step S1202. Further, the operation control unit 20 registers the destination name and the destination number thus correlated to the one-touch number of the one-touch key in the destination information table 501 of the destination information storage unit 30. Further, the operation control unit 20 displays the facsimile transmission screen 601, thereby completing the destination editing operation.

Figure 13:
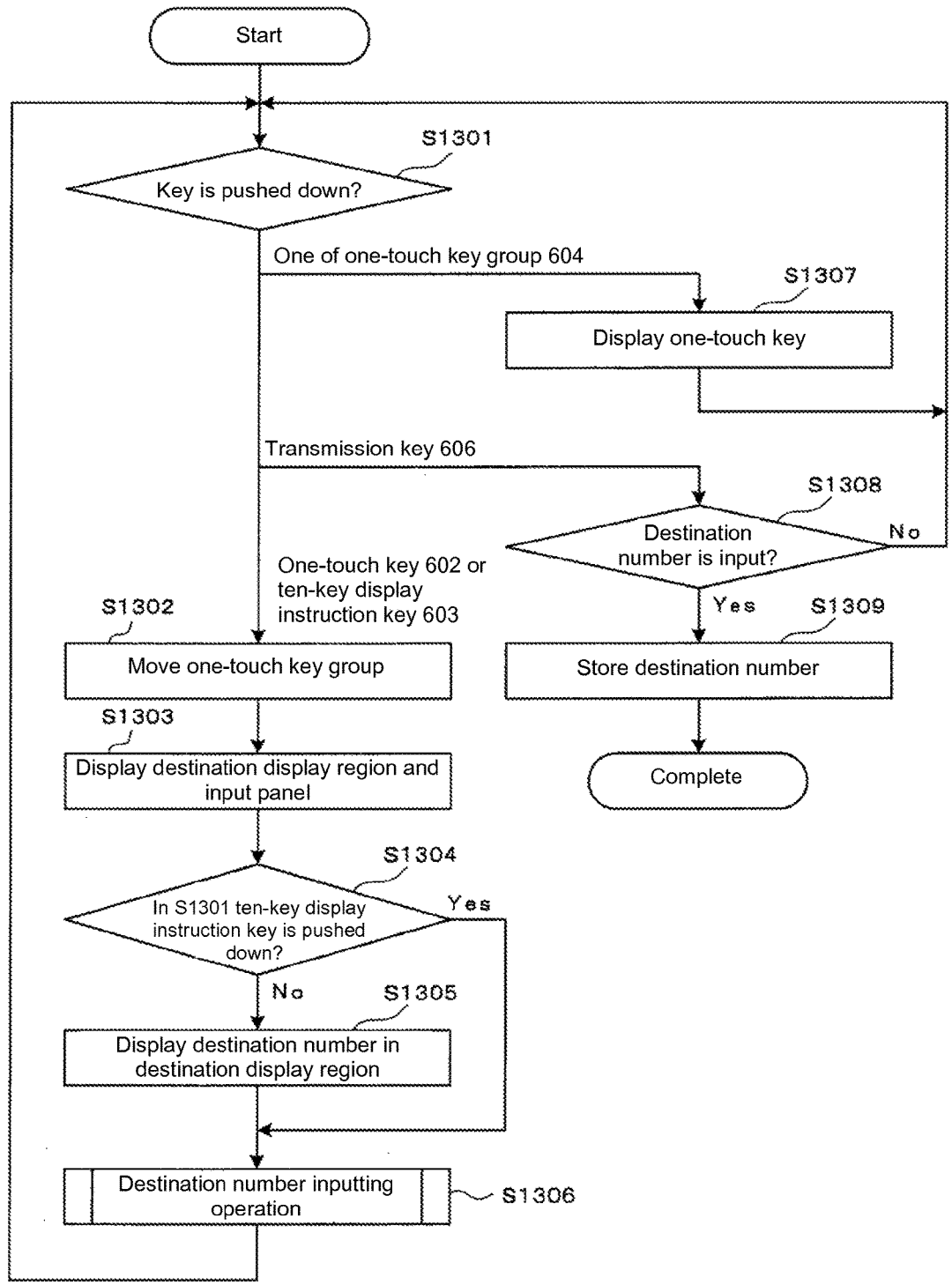
FIG. 13 is a flow chart showing a destination number obtaining operation of the communication apparatus according to the first embodiment of the present invention.

FIG. 13 is a flow chart showing a destination number obtaining operation of the communication apparatus 1 for obtaining the destination number of the transmission destination when the transmission operation of the communication apparatus 1 is performed according to the first embodiment of the present invention.

In step S1301, the operation control unit 20 determines whether one of the keys in the facsimile transmission screen 601 is pushed down. In step S1302, when the operation control unit 20 determines that the one-touch key 602 or the ten-key display instruction key 603 in the facsimile transmission screen 601 is pushed down, the operation control unit 20 moves the one-touch key group 604 by one line in the facsimile transmission screen 601 as shown in FIG. 11. In step S1303, the operation control unit 20 displays the destination display region 1101 and the input panel 1102. At this moment, the operation control unit 20 displays the input panel 1102 at the location such that at least a part of each of the one-touch keys in the one-touch key group 604 becomes visible.

In step S1304, the operation control unit 20 determines whether the key determined to be pushed down in step S1301 is the ten-key display instruction key 603. In step S1305, when the operation control unit 20 determines that the key determined to be pushed down in step S1301 is not the ten-key display instruction key 603 (No in step S1304), the operation control unit 20 retrieves the destination number "00" having the one-touch number "000" from the destination information storage unit 30. Then, the operation control unit 20 displays the destination number "00" in the destination display region 1101. In step S1306, the operation control unit 20 performs a destination number inputting operation shown in FIG. 14. On the other hand, when the operation control unit 20 determines that the key determined to be pushed down in step S1301 is the ten-key display instruction key 603 (Yes in step S1304), the operation control unit 20 performs a destination number inputting operation in step S1306 without performing step S1305. Through the steps described above, the destination number is input through the input panel 1102.

Figure 14:
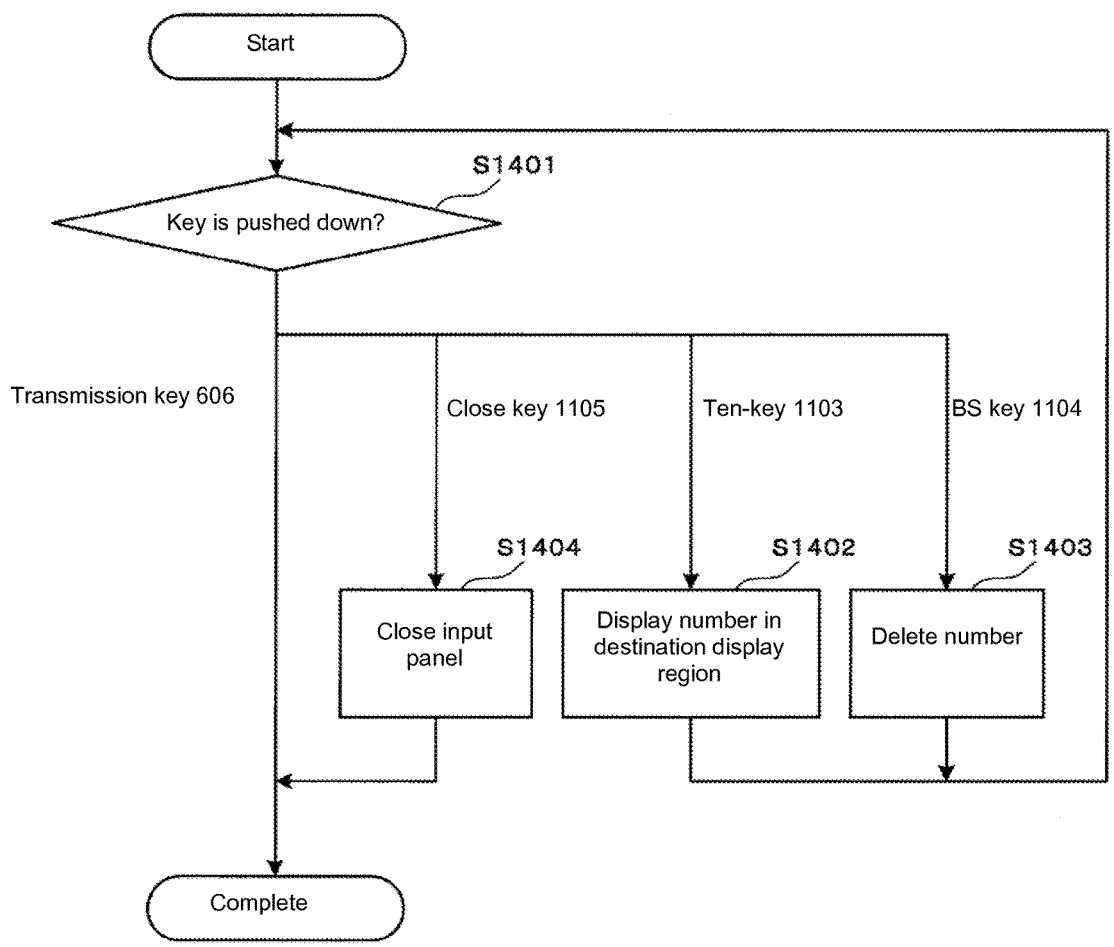
FIG. 14 is a flow chart showing a destination number inputting operation of the communication apparatus in step S1306 shown in FIG. 13 according to the first embodiment of the present invention.

FIG. 14 is a flow chart showing the destination number inputting operation of the communication apparatus 1 in step S1306 shown in FIG. 13 according to the first embodiment of the present invention.

In step 1401, the operation control unit 20 determines whether one of the keys in the facsimile transmission screen 601 shown in FIG. 11 is pushed down. In step S1402, when the operation control unit 20 determines that one of the keys of the ten-key 1103 is pushed down in step S1402, the operation control unit 20 moves the cursor 1106 toward the right side by one digit, and the process returns to step S1401.

In step S1403, when the operation control unit 20 determines that the BS key 1104 is pushed down in step S1402, the operation control unit 20 deletes one single digit number on the left side of the cursor 1106, and the process returns to step S1401.

In step S1404, when the operation control unit 20 determines that the close key 1105 is pushed down in step S1402, the operation control unit 20 deletes the input panel 1102, thereby completing the destination number inputting operation.

When the operation control unit 20 determines that the transmission key 606 is pushed down in step S1402, the operation control unit 20 completes the destination number inputting operation, and the process returns to step S1308 shown in FIG. 13.

With reference to the flow chart shown in FIG. 13, in step S1307, when the operation control unit 20 determines that one of the one-touch keys of the one-touch key group 604 is pushed down in step S1301, the operation control unit 20 displays the one of the one-touch keys in the visually depressed shape as shown in FIG. 7, and the process returns to step S1301. When the operation control unit 20 determines that the transmission key 606 in the facsimile transmission screen 601 is pushed down, the process proceeds to step S1308.

In step S1308, the operation control unit 20 determines whether the destination number is input or not. In step S1309, when the operation control unit 20 determines that the destination is input (Yes in step S1308), the operation control unit 20 stores the destination number thus input as the destination number of the transmission destination in the storage unit 21, thereby completing the destination number obtaining operation.

On the other hand, when the operation control unit 20 determines that the destination is not input (No in step S1308), the operation control unit 20 returns to step S1301.

As described above, in the first embodiment, when the destination number is input through the destination number inputting operation, the operation control unit 20 stores the contents displayed in the destination display region 1101 in the storage unit 21. When one of the one-touch keys of the one-touch key group 604 is pushed down, the operation control unit 20 retrieves the destination number of the one of the one-touch keys thus pushed down (that is, the one-touch key displayed in the visually depressed shape) from the destination information storage unit 30, and stores the destination number in the storage unit 21. In all other cases, the operation control unit 20 returns to step S1301.

Figure 15:
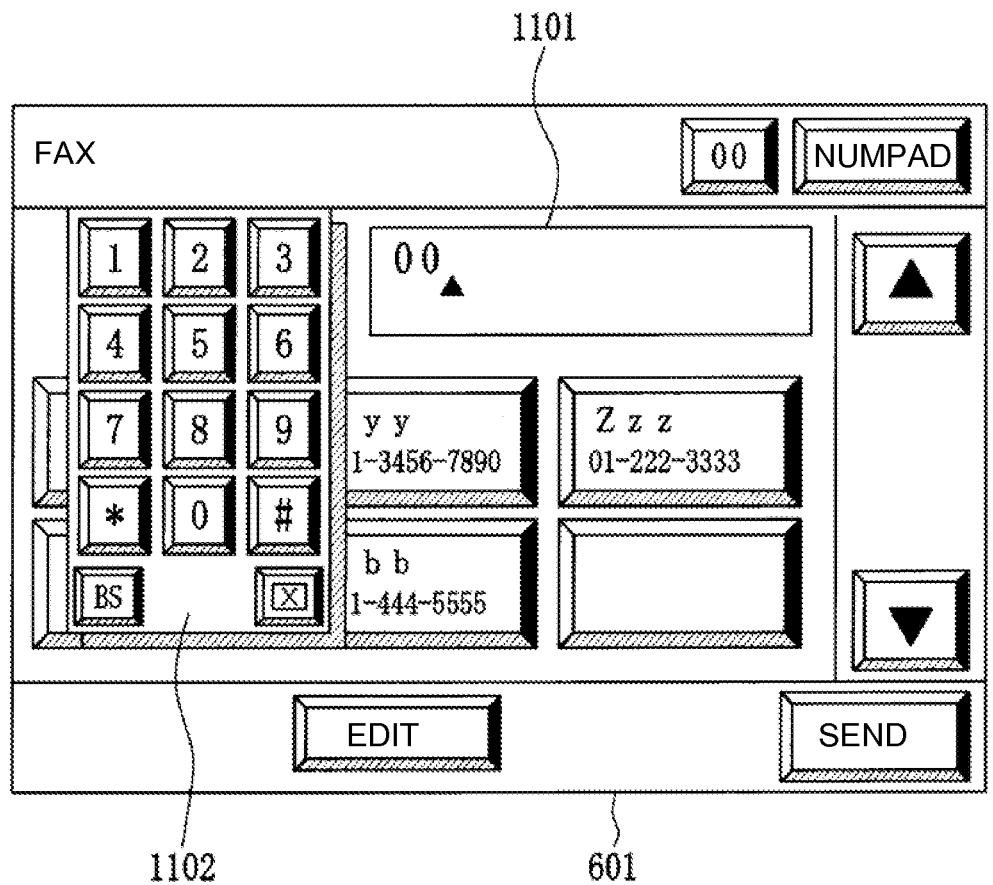
FIG. 15 is a schematic view showing an example No. 3 of the facsimile transmission screen displayed on the display screen of the touch panel of the communication apparatus when the one-touch key of the one-touch number "000" is pushed down according to the first embodiment of the present invention.

FIG. 15 is a schematic view showing an example No. 3 of the facsimile transmission screen 601 displayed on the display screen S of the touch panel 10 of the communication apparatus 1 when the one-touch key of the one-touch number "000" is pushed down according to the first embodiment of the present invention. In the first embodiment, as shown in FIG. 11, the input panel 1102 is arranged on the right side of the destination display region 1101. Alternatively, in consideration of a left-hand operator, the input panel 1102 may be arranged on the left side of the destination display region 1101 as shown in FIG. 15.

As described above, in the first embodiment, the communication apparatus 1 performs the facsimile transmission, and may perform transmission other than the facsimile transmission. In other words, the present invention is not limited to the facsimile, and may be applicable to other communication apparatus. Accordingly, the destination information is not limited to the telephone number, and may include an electric mail address. Further, the text input screen is not limited to the ten-key screen, and may include a keyboard screen.

Figure 16:
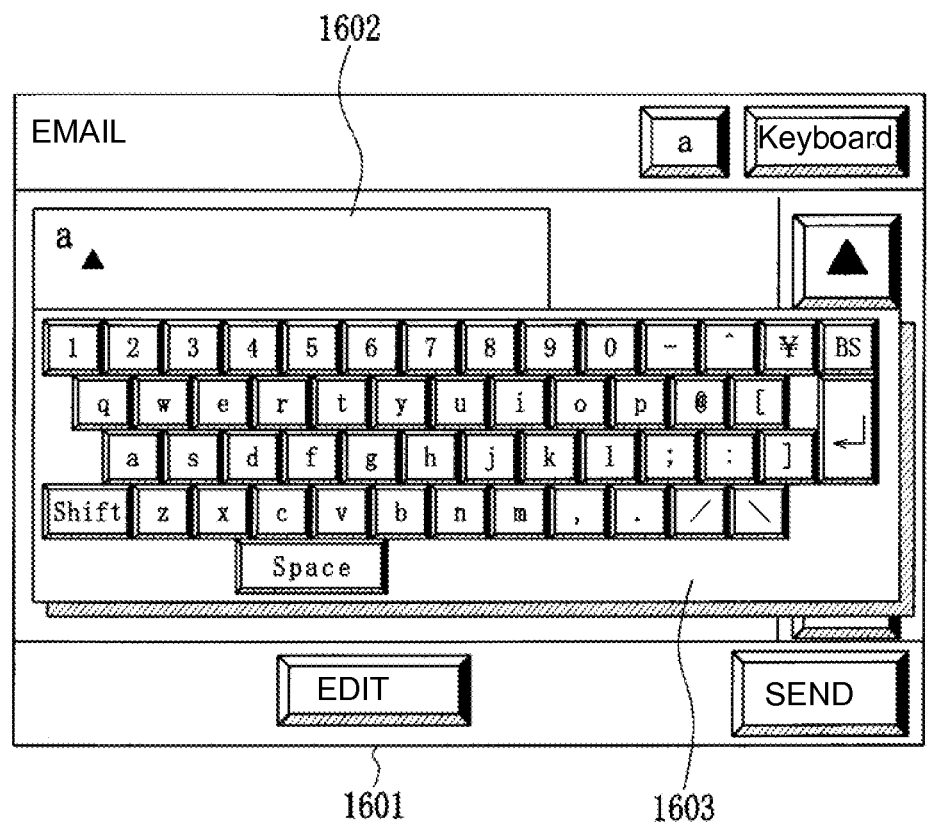
FIG. 16 is a schematic view showing an electric mail transmission screen displayed on the display screen of the touch panel of the communication apparatus according to the first embodiment of the present invention.

FIG. 16 is a schematic view showing an electric mail transmission screen 1601 displayed on the display screen S of the touch panel 10 of the communication apparatus 1 according to the first embodiment of the present invention.

As shown in FIG. 16, the operation control unit 20 may configured to display a mail address display region 1602 and a QWERTY keyboard 1603 on the electric mail transmission screen 1601. Accordingly, when the operation control unit 20 receives an operation of inputting a mail address through the QWERTY keyboard 1603, the operation control unit 20 transmits an electric mail to the mail address thus input.

In the first embodiment described above, it is possible to obtain at least the following effects. First, the operation control unit 20 displays the first key 401 correlated to at least one letter set in advance. When the operation control unit 20 receives the operation of specifying the first key 401, the operation control unit 20 displays the text input screen 403 on the display screen S. Then, the operation control unit 20 receives the operation of inputting at least one letter relative to the text input screen 403, so that the operation control unit 20 obtains the text string formed of at least one letter correlated to the first key 401 thus specified and at least one letter thus input as the destination information of the transmission destination. Accordingly, it is possible to provide the communication apparatus 1 with good utility efficiency and operational efficiency of the display screen S when the destination information is obtained.

In the conventional communication apparatus, when the display screen is operated to input the destination information, a text input screen is displayed on the display screen from the beginning. Accordingly, even when the text input screen is not necessary, the text input screen occupies a certain area of the display screen, thereby lowering utility efficiency of the display screen. For example, even when an operator has not decided yet whether a telephone number is input through the text input screen such as a ten-key or the transmission destination is selected from a list registered in advance through another key, the text input screen is displayed on the display screen. Accordingly, even when the text input screen is not necessary, the text input screen occupies a certain area of the display screen corresponding to the ten-key (for example, an area of 12 keys), thereby making it difficult to display another key.

On the other hand, in the first embodiment, when the operation control unit 20 receives the operation of specifying the first key 401, the operation control unit 20 displays the text input screen 403 on the display screen S. Accordingly, until the operation control unit 20 receives the operation of specifying the first key 401, it is possible to utilize the region of the text input screen 403 for displaying other keys such as the second key group 402 or other information. As a result, as opposed to the conventional communication apparatus, in which the text input screen is displayed from the beginning, it is possible to improve utility efficiency and operational efficiency of the display screen S of the communication apparatus 1.

In the conventional communication apparatus, it may be configured such that a specific key is provided only for displaying the text input screen. However, in this configuration, it is necessary to perform one additional step for displaying the text input screen, thereby lowering operational efficiency of the conventional communication apparatus as opposed to the configuration, in which the text input screen is displayed from the beginning.

On the other hand, in the first embodiment, when the operation control unit 20 receives the operation of specifying the first key 401, the operation control unit 20 obtains the text string formed of at least one letter correlated to the first key 401 thus specified as the destination information of the transmission destination. Accordingly, it is not necessary to perform an operation of inputting at least one letter correlated to the first key 401. As a result, as opposed to the conventional communication apparatus, in which the text input screen is displayed from the beginning, it is possible to obtain the destination information with better operational efficiency.

More specifically, in the first embodiment, when the operator pushes down the first key 401, it is possible to perform the operations of inputting at least one letter correlated to the first key 401 and displaying the ten-key at the same time. In other words, the first key 401 is provided for both inputting the specific letter and displaying the text input screen 403. Accordingly, when the letter "0", which is most often used as the first letter of the destination number, or an outside calling number is registered as the first key 401, it is possible to input the destination number through the ten-key with the same operational efficiency as that of the configuration, in which the text input screen is displayed from the beginning. Further, the ten-key is displayed only when the ten-key is necessary, that is, the ten-key is not displayed when the ten-key is not necessary. Accordingly, it is possible to utilize the area of the ten-key for displaying other keys such as the second key group 402, thereby making it possible to efficiently use the whole area of the touch panel 10.

Second, in the first embodiment, when the operation control unit 20 receives the operation of specifying the first key 401, the operation control unit 20 displays at least one letter correlated to the first key 401 in the original reading unit 404 on the display screen S. Further, every time when the operation control unit 20 receives the operation of inputting at least one letter relative to the text input screen 403, the operation control unit 20 displays at least one letter thus input in the original reading unit 404 on the display screen S. Accordingly, it is possible for the operator to input a letter while confirming the letter already input in addition to at least one letter correlated to the first key 401.

Third, in the first embodiment, when the operation control unit 20 receives the operation of specifying the first key 401, the operation control unit 20 displays the original reading unit 404 on the display screen S. Accordingly, as opposed to the configuration, in which the text input screen is displayed from the beginning, it is possible to utilize the display screen S more efficiently.

Fourth, in the first embodiment, when the operation control unit 20 displays the text input screen 403 on the display screen S where the second key group 402 is arranged, the operation control unit 20 displays the text input screen 403 at a location where at least a part of each of the second keys becomes visible. In other words, it is possible to display at least a part of each of the second keys displayed on the display screen S, thereby securing actual information quantity displayed to the operator.

Second Embodiment

A second embodiment of the present invention will be explained next. In the following description, components in the second embodiment similar to those in the first embodiment will be explained only briefly or explanations thereof will be omitted. Further, components in the second embodiment similar to those in the first embodiment will be designated with the same reference numerals.

Figure 17A:
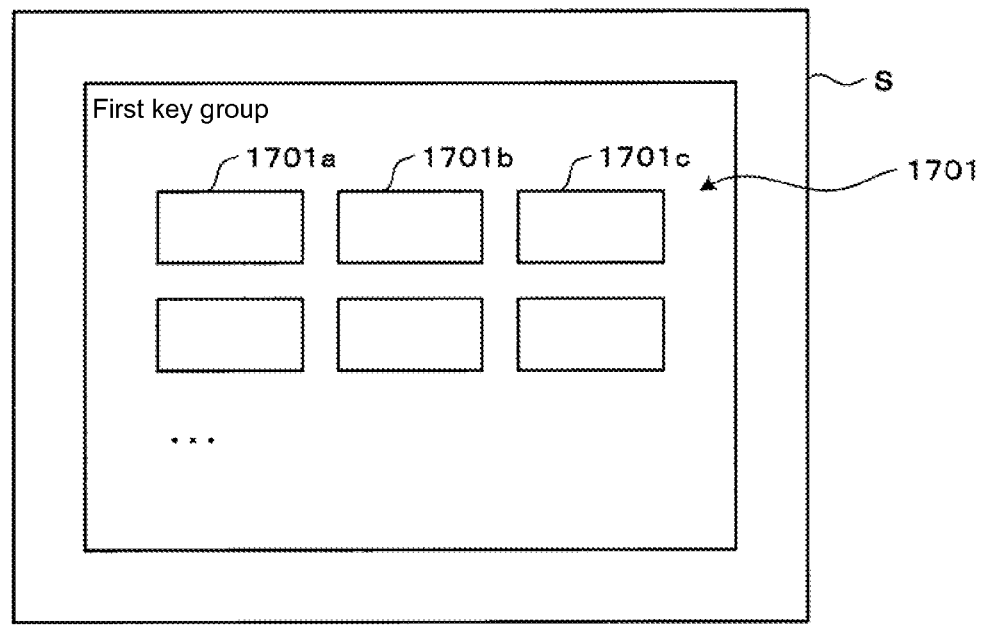
FIGS. 17(a) and 17(b) are schematic views showing a screen displayed on a display screen of a touch panel of a communication apparatus according to a second embodiment of the present invention.
Figure 17B:
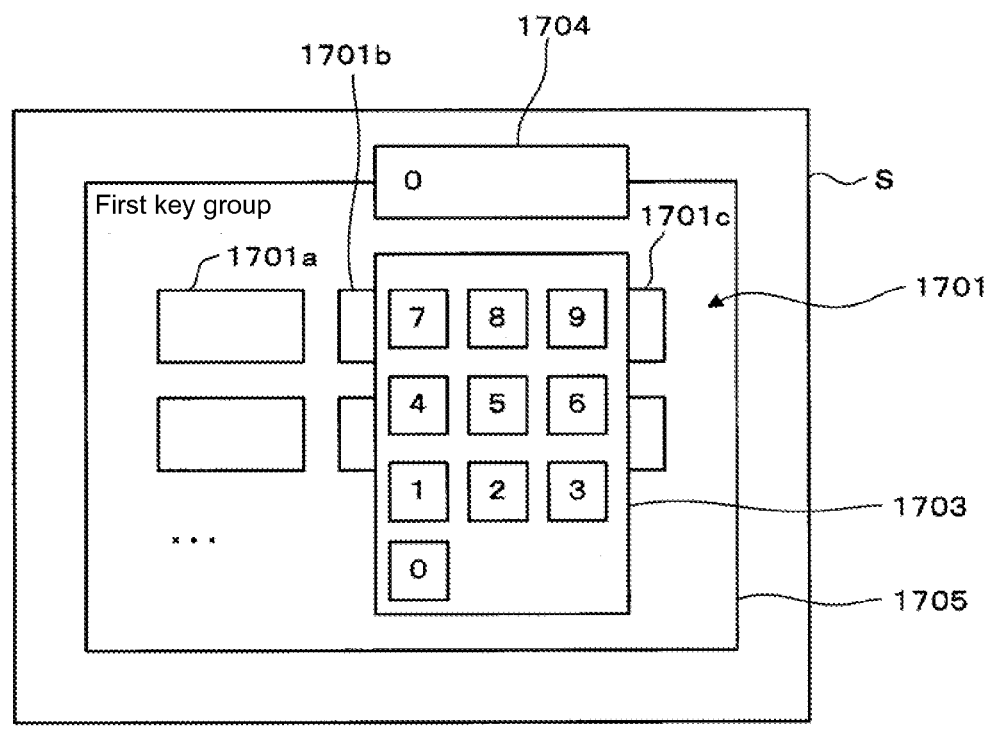

FIGS. 17(a) and 17(b) are schematic views showing a screen displayed on the display screen S of the touch panel 10 of the communication apparatus 1 according to the second embodiment of the present invention.

In the second embodiment, the communication apparatus 1 includes a plurality of first keys. As shown in FIG. 17(a), the operation control unit 20 displays a first key group 1701 on the display screen S of the touch panel 10.

In the second embodiment, the first key group 1701 includes a plurality of first keys 1701a, 1701b, 1701c, and the like. Each of the first keys 1701a, 1701b, 1701c, and the like is correlated to at least one letter defined in advance. More specifically, each of the first keys 1701a, 1701b, 1701c, and the like is correlated to at least one letter constituting a portion of the destination number (for example, a first portion of the destination number). The correlation between the first keys 1701a, 1701b, 1701c, and the like and at least one letter is stored in the destination information storage unit 30.

In the second embodiment, when the operation control unit 20 receives the operation of specifying one of the first keys 1701a, 1701b, 1701c, and the like in the first key group 1701, the operation control unit 20 displays a text input screen 1703 on the display screen S, so that the operation control unit 20 receives the operation of inputting at least one letter relative to the text input screen 1703. Accordingly, the operation control unit 20 obtains the text string formed of at least one letter correlated to one of the first keys 1701a, 1701b, 1701c, and the like thus specified and at least one letter thus input as the destination number of the transmission destination. For example, through the text input screen 1703, the operation control unit 20 receives an input of a text string formed of at least one letter constituting a remaining portion (for example, a rear portion) of the destination number. Then, the operation control unit 20 obtains the text string formed of the text string correlated to one of the first keys 1701a, 1701b, 1701c, and the like thus specified and the text string thus input as the destination number of the transmission destination.

More specifically, as shown in FIG. 17(b), the operation control unit 20 displays the text input screen 1703 on the display screen S. Further, the operation control unit 20 displays a destination display region 1704 on the display screen S, so that the operation control unit 20 displays at least one letter correlated to one of the first keys 1701a, 1701b, 1701c, and the like thus specified in the destination display region 1704.

In the second embodiment, every time when the operation control unit 20 receives the operation of inputting the letter relative to the text input screen 1703, the operation control unit 20 displays the letter thus input in the destination display region 1704. Further, when the operation control unit 20 determines that the operation control unit 20 receives the specific determination operation, the operation control unit 20 obtains the letter displayed in the destination display region 1704 as the destination number of the transmission destination, and completes the process.

In the second embodiment, the information stored in the destination information storage unit 30 is registered through, for example, an input of the operator. In this case, the operation control unit 20 receives the operation of inputting at least one letter by selecting one of the first keys 1701a, 1701b, 1701c, and the like through the touch panel 10. Then, the operation control unit 20 registers at least one letter thus input in the destination information storage unit 30 such that at least one letter is correlated to one of the first keys 1701a, 1701b, 1701c, and the like.

As shown in FIG. 17(b), the operation control unit 20 displays the text input screen 1703 such that the text input screen 1703 is overlapped with a screen 1705 where the first keys 1701a, 1701b, 1701c, and the like are arranged (or the first key group 1701). More specifically, the operation control unit 20 displays the text input screen 1703 at a location where at least a part of each of the first keys 1701a, 1701b, 1701c, and the like arranged in the screen 1705 becomes visible. In the example shown in FIG. 17(b), all of the first keys 1701a, 1701b, 1701c, and the like, which are displayed before the text input screen 1703 is displayed, are arranged in the screen 1705. It may be configured such that the screen 1705 includes the first keys 1701a, 1701b, 1701c, and the like in a different number from that thereof before the text input screen 1703 is displayed. For example, it may be configured such that the screen 405 includes the first keys 1701a, 1701b, 1701c, and the like in a smaller number from that thereof before the text input screen 1703 is displayed.

Next, the communication apparatus 1 will be explained in more detail with reference to FIGS. 18 to 22. In the second embodiment, the communication apparatus 1 includes a plurality of one-touch keys. All of the one-touch keys are configured to function as the first keys.

Figure 18:
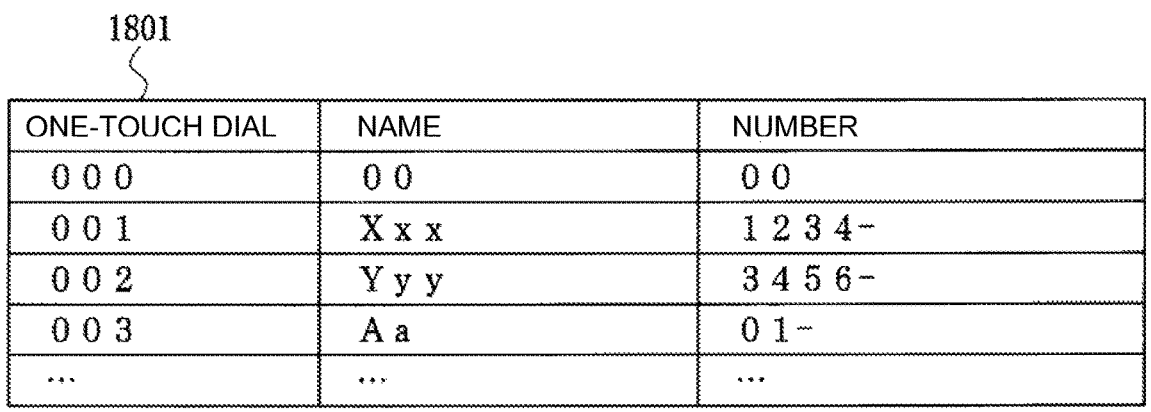
FIG. 18 is a schematic view showing a destination information table stored in a destination information storage unit of the communication apparatus according to the second embodiment of the present invention.

FIG. 18 is a schematic view showing a destination information table 1801 stored in the destination information storage unit 30 of the communication apparatus 1 according to the second embodiment of the present invention.

As shown in FIG. 18, the destination information table 1801 includes specific one-touch numbers assigned to each of the one-touch keys; destination names corresponding to the one-touch keys; and numbers (or text strings) corresponding to the one-touch keys in such a manner that the one-touch numbers, the destination names, and the numbers are mutually correlated per one-touch key. In other words, the destination information table 1801 includes a plurality of records, and each of the records is formed of the three fields such as the one-touch number, the destination name, and the destination number. The specific one-touch number assigned to each of the one-touch keys is stored in the one-touch number field. The destination name is stored in the destination name field. The destination number is stored as a part of the telephone number (the destination number) of the transmission destination in the destination number field.

Figure 19:
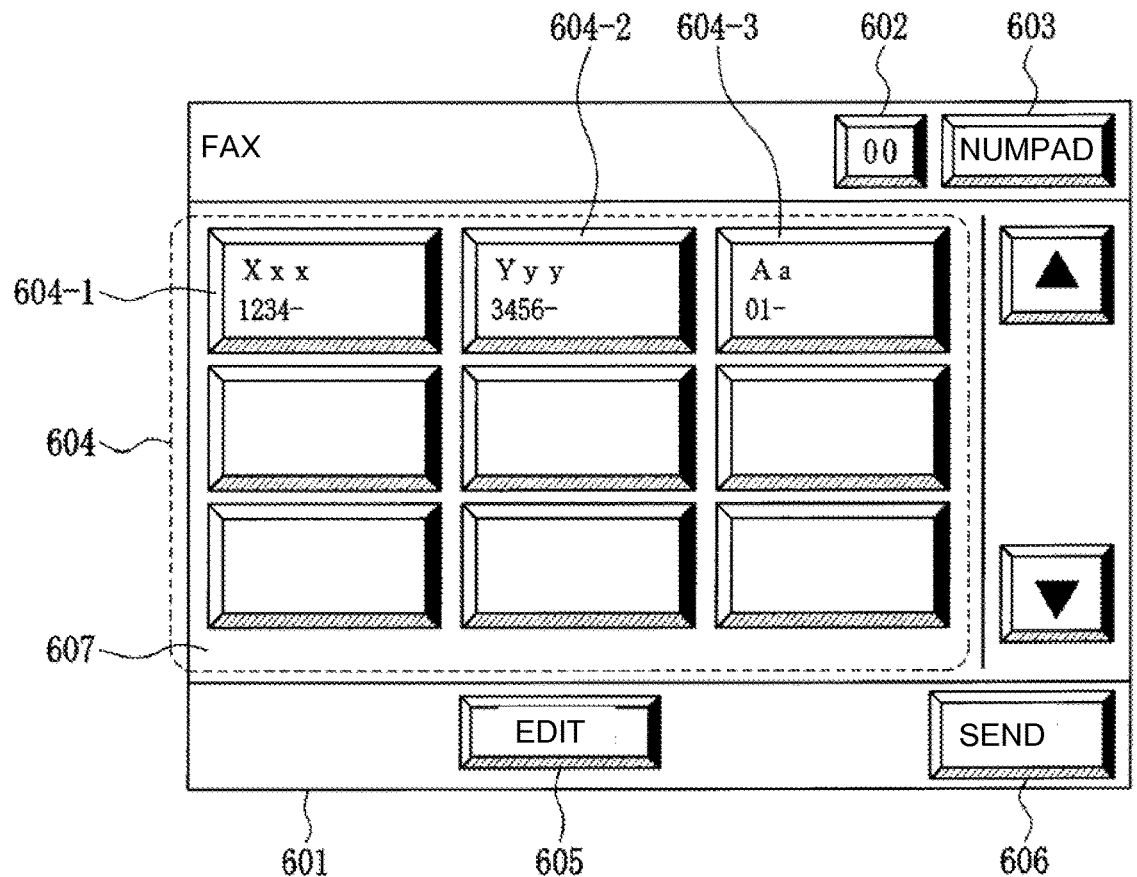
FIG. 19 is a schematic view showing a facsimile transmission screen displayed on the display screen of the touch panel of the communication apparatus according to the second embodiment of the present invention.

FIGS. 19 to 11 are views showing examples of screens to be displayed on the display screen S of the touch panel 10. FIG. 19 is a schematic view showing the facsimile transmission screen 601 displayed on the display screen S of the touch panel 10 of the communication apparatus 1 according to the second embodiment of the present invention.

As shown in FIG. 19, similar to that shown in FIG. 6, the facsimile transmission screen 601 includes the one-touch key 602; the ten-key display instruction key 603; the one-touch key group 604; the destination editing key 605; and the transmission key 606. The one-touch key group 604 includes the one-touch keys 604-1, 604-2, 604-3, and the like.

Figure 20:
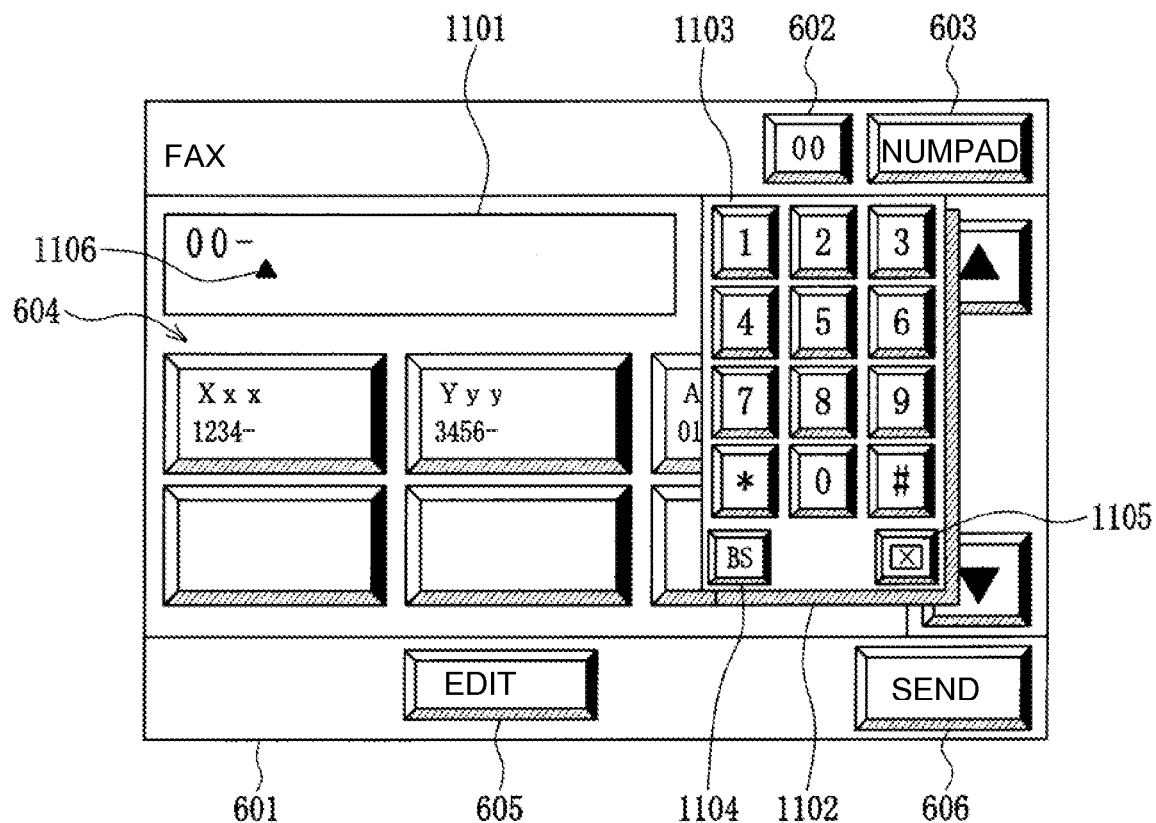
FIG. 20 is a schematic view showing an example No. 1 of the facsimile transmission screen displayed on the display screen of the touch panel of the communication apparatus when a one-touch key of a one-touch number "000" is pushed down according to the second embodiment of the present invention.

FIG. 20 is a schematic view showing an example No. 1 of the facsimile transmission screen 601 displayed on the display screen S of the touch panel 10 of the communication apparatus 1 when the one-touch key 602 having the one-touch number "000" is pushed down according to the second embodiment of the present invention.

As shown in FIG. 20, similar to that shown in FIG. 11, in addition to the one-touch key 602, the ten-key display instruction key 603, the one-touch key group 604, the destination editing key 605, and the transmission key 606, the facsimile transmission screen 601 further includes the destination display region 1101 and the input panel 1102.

Figure 21:
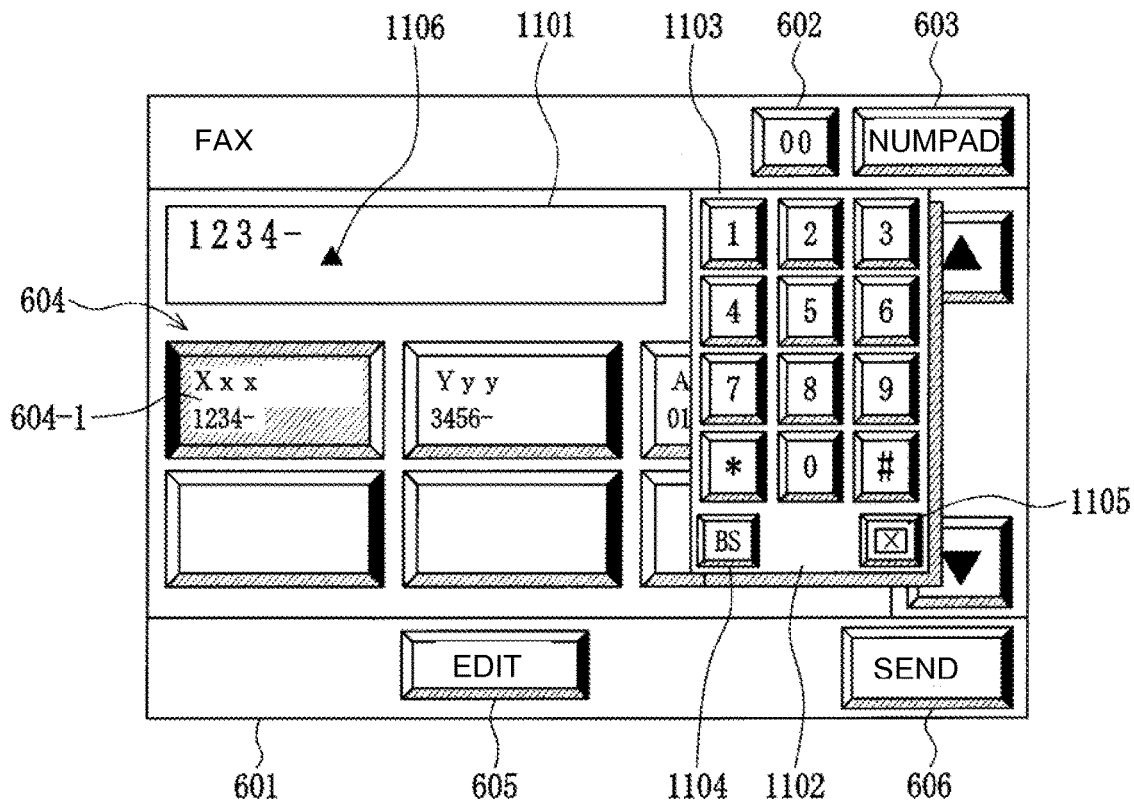
FIG. 21 is a schematic view showing an example No. 2 of the facsimile transmission screen displayed on the display screen of the touch panel of the communication apparatus when a one-touch key of a one-touch number "001" is pushed down according to the second embodiment of the present invention.

FIG. 21 is a schematic view showing an example No. 2 of the facsimile transmission screen 601 displayed on the display screen S of the touch panel 10 of the communication apparatus 1 when the one-touch key 604-1 having the one-touch number "001" is pushed down according to the second embodiment of the present invention.

As shown in FIG. 21, similar to that shown in FIG. 11, in addition to the one-touch key 602, the ten-key display instruction key 603, the one-touch key group 604, the destination editing key 605, and the transmission key 606, the facsimile transmission screen 601 further includes the destination display region 1101 and the input panel 1102. The destination display region 1101 displays the text string (or the destination number) input through the input panel 1102. It should be noted that the one-touch key 604-1 having the one-touch number "001" is displayed in the state indicating that the one-touch key 604-1 is selected as the destination. More specifically, the one-touch key 604-1 is displayed such that a key shape of the one-touch key 604-1 is visually depressed.

In the second embodiment, the destination editing screen 801, the destination name editing screen 901, and the destination number editing screen 1001 are similar to those in the first embodiment shown in FIGS. 8, 9, and 10. Further, the destination editing operation and the transmission operation are similar to those in the first embodiment shown in FIGS. 12 and 2.

Figure 22:
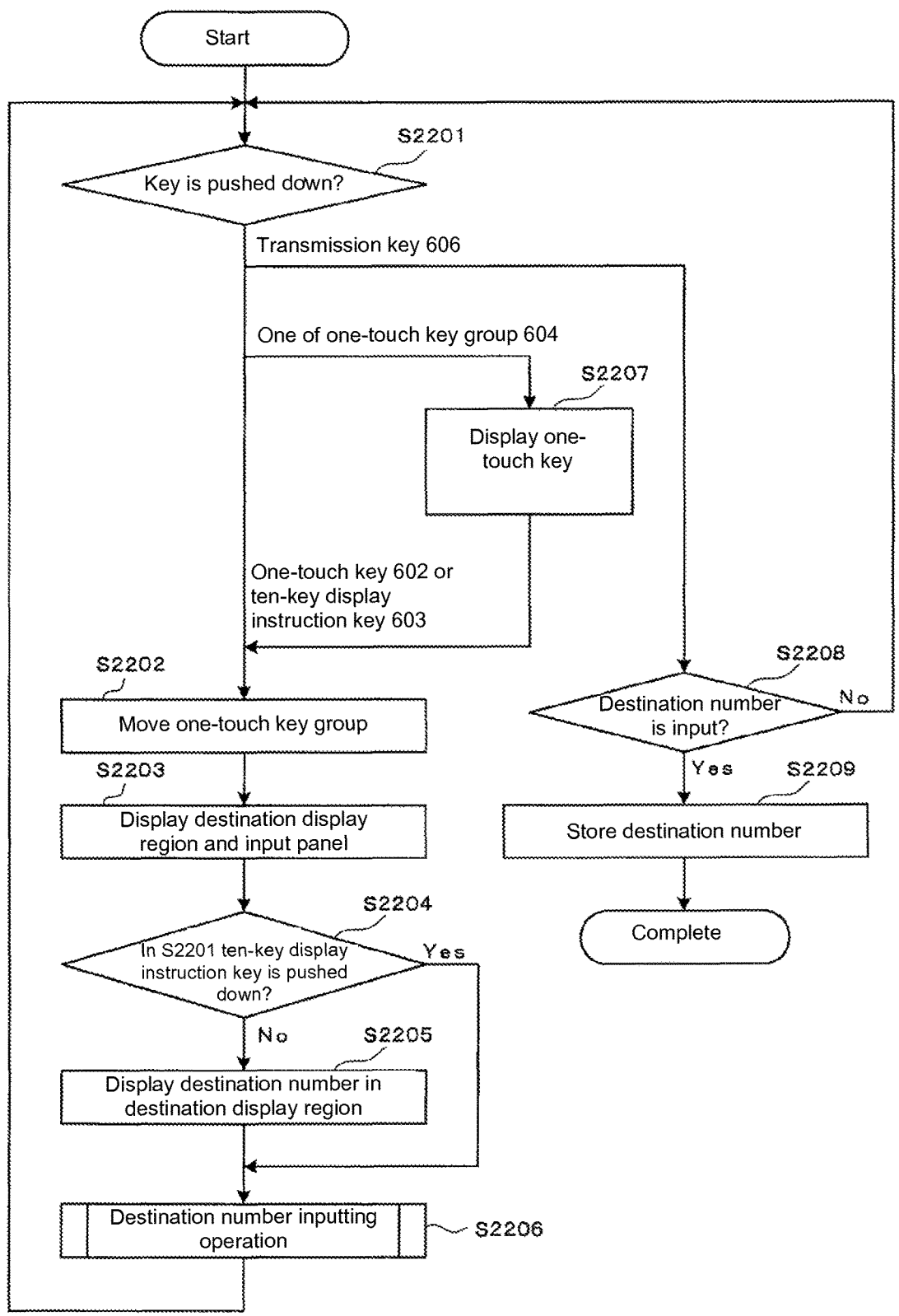
FIG. 22 is a flow chart showing a destination number obtaining operation of the communication apparatus according to the second embodiment of the present invention.

FIG. 22 is a flow chart showing the destination number obtaining operation (for example, the operation in step S201 shown in FIG. 2) of the communication apparatus 10 according to the second embodiment of the present invention.

In the destination number obtaining operation, in step S2201, the operation control unit 20 determines whether one of the keys in the facsimile transmission screen 601 is pushed down. In step S2202, when the operation control unit 20 determines that the one-touch key 602 or the ten-key display instruction key 603 in the facsimile transmission screen 601 is pushed down, the operation control unit 20 moves the one-touch key group 604 by one line in the facsimile transmission screen 601 as shown in FIG. 20. In step S2203, the operation control unit 20 displays the destination display region 1101 and the input panel 1102, and the process proceeds to step S2204. At this moment, the operation control unit 20 displays the input panel 1102 at the location such that at least a part of each of the one-touch keys in the one-touch key group 604 becomes visible.

In step S2207, when the operation control unit 20 determines that one of the one-touch keys of the one-touch key group 604 is pushed down in step S2201, the operation control unit 20 displays the one of the one-touch keys in the visually depressed shape as shown in FIG. 21. Then, in step S2202, the operation control unit 20 moves the one-touch key group 604 by one line in the facsimile transmission screen 601 as shown in FIG. 20. In step S2203, the operation control unit 20 displays the destination display region 1101 and the input panel 1102, and the process proceeds to step S2204. At this moment, the operation control unit 20 displays the input panel 1102 at the location such that at least a part of each of the one-touch keys in the one-touch key group 604 becomes visible.

In step S2204, the operation control unit 20 determines whether the key determined to be pushed down in step S2201 is the ten-key display instruction key 603. In step S2205, when the operation control unit 20 determines that the key determined to be pushed down in step S2201 is not the ten-key display instruction key 603 (No in step S2204), the operation control unit 20 retrieves the destination number of the one-touch key thus selected from the destination information storage unit 30. Then, the operation control unit 20 displays the destination number thus retrieved in the destination display region 1101. In step S2206, the operation control unit 20 performs the destination number inputting operation shown in FIG. 14. On the other hand, when the operation control unit 20 determines that the key determined to be pushed down in step S2201 is the ten-key display instruction key 603 (Yes in step S2204), the operation control unit 20 performs the destination number inputting operation in step S2206 without performing step S2205. Through the steps described above, similar to the first embodiment, the destination number is input through the input panel 1102.

When the operation control unit 20 determines that the key determined to be pushed down in step S2201 is the transmission key 606, the process proceeds to step S2208. In step S2208, the operation control unit 20 determines whether the destination number is input or not. In step S2209, when the operation control unit 20 determines that the destination is input (Yes in step S2208), the operation control unit 20 stores the contents displayed in the destination display region 1101 as the destination number of the transmission destination in the storage unit 21, thereby completing the destination number obtaining operation.

On the other hand, when the operation control unit 20 determines that the destination is not input (No in step S2208), the operation control unit 20 returns to step S2201.

In the second embodiment, the operation control unit 20 may be configured to display the input panel 1102 or the text input screen 1703 in the following ways. First, the operation control unit 20 may be configured to display the input panel 1102 at the location such that the input panel 1102 is not overlapped with the first key thus specified.

Figure 23:
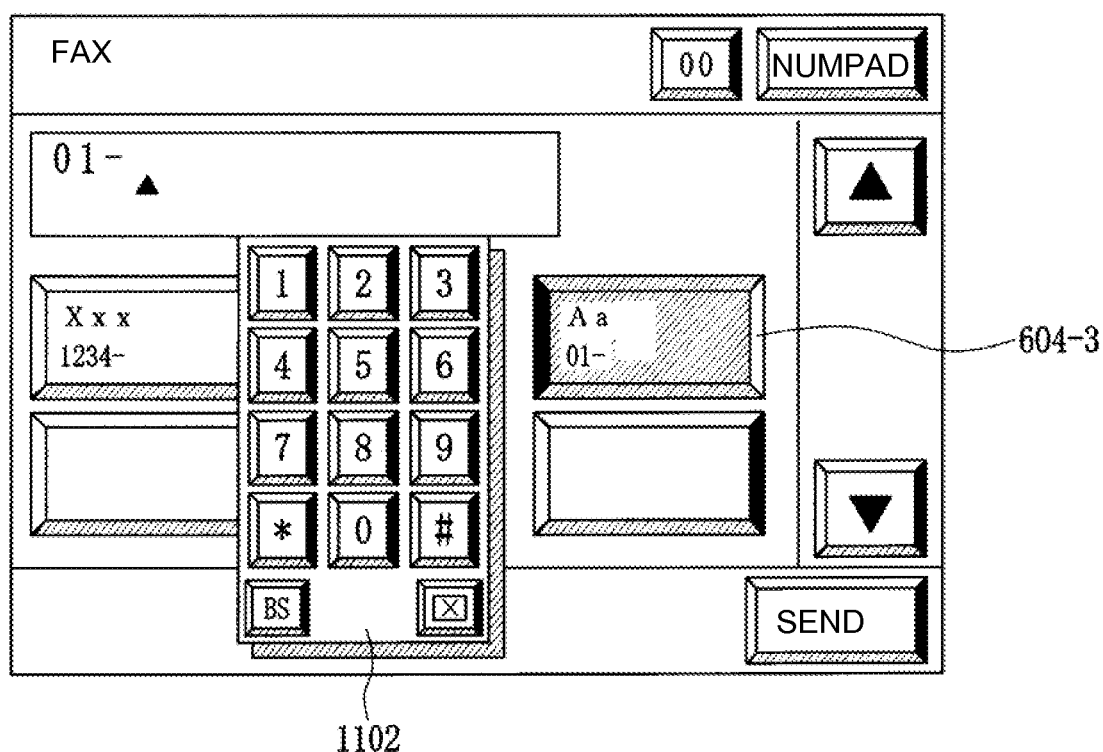
FIG. 23 is a schematic view showing an example No. 3 of the facsimile transmission screen displayed on the display screen of the touch panel of the communication apparatus according to the second embodiment of the present invention.

FIG. 23 is a schematic view showing an example No. 3 of the facsimile transmission screen 601 displayed on the display screen S of the touch panel 10 of the communication apparatus 1 according to the second embodiment of the present invention.

As shown in FIG. 23, the operation control unit 20 displays the input panel 1102 at the specific location such that the whole portion of the one-touch key 604-3 selected from the one-touch keys becomes visible.

Second, when the operation control unit 20 receives the operation of specifying one of the first keys included in the screen where the first keys are arranged, the operation control unit 20 may be configured to display the text input screen 1703 or the input panel 1102 in the reduced size such that the text input screen 1703 or the input panel 1102 is not overlapped with the first key thus specified.

For example, as shown in FIG. 17(*b*), when the operation control unit 20 receives the operation of specifying one of the first keys included in the first key group 1701, the operation control unit 20 may be configured to display the screen 1705 in the reduced size such that the text input screen 1703 is not overlapped with the screen 1705 of the first key group 1701.

Figure 24:
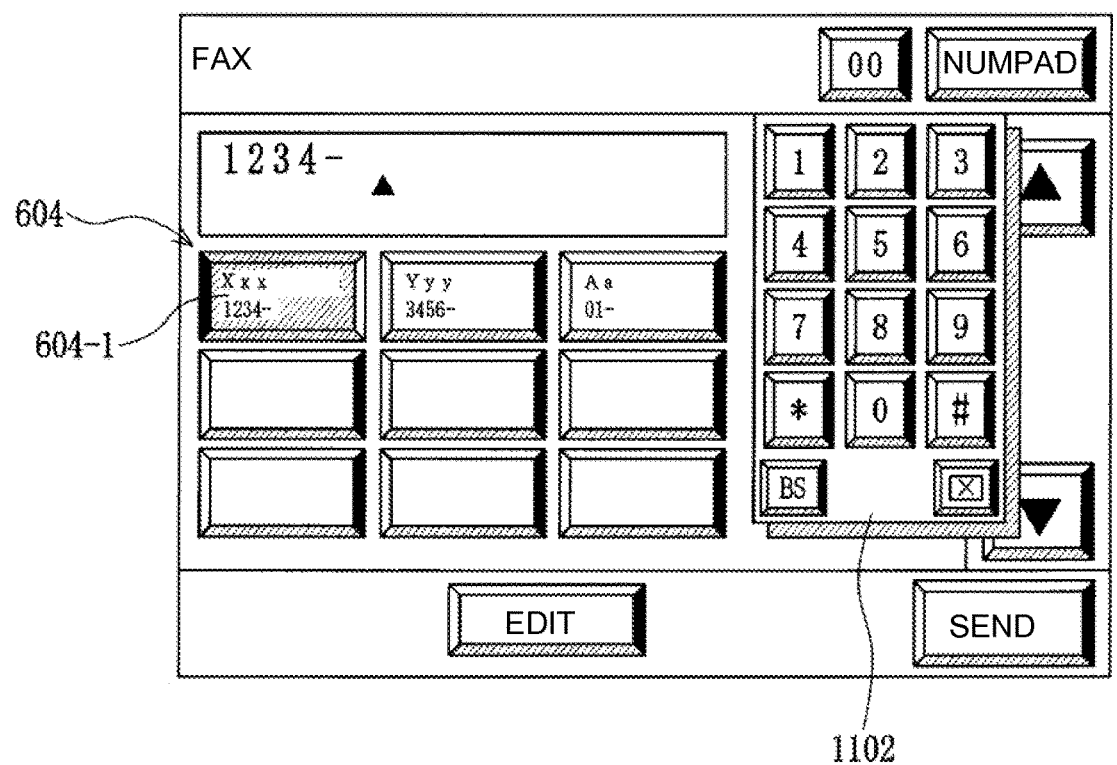
FIG. 24 is a schematic view showing an example No. 4 of the facsimile transmission screen displayed on the display screen of the touch panel of the communication apparatus according to the second embodiment of the present invention.

FIG. 24 is a schematic view showing an example No. 4 of the facsimile transmission screen 601 displayed on the display screen S of the touch panel 10 of the communication apparatus 1 according to the second embodiment of the present invention.

Further, as shown in FIG. 24, when the one-touch key 604-1 in the one-touch key group 604 is pushed down, the operation control unit 20 may be configured to display the one-touch key group 604 in the reduced size such that the input panel 1102 is not overlapped with the one-touch key group 604.

In the second embodiment, there is no second key, and it may be configured such that more than one second key may be provided. For example, in the second embodiment, all of the one-touch keys are assigned as the first keys, and it may be configured such that one or more of the one-touch keys are assigned as the second keys. More specifically, a part of the one-touch key group 604 may be used as the second keys.

As described above, in the second embodiment, the touch panel 10 includes a plurality of first keys. Accordingly, in addition to the effect of the first embodiment, it is possible to assign the first keys to a plurality of numbers such as a plurality of outside telephone numbers and a plurality of country codes, thereby improving operational efficiency of the communication apparatus 1.

Further, in the second embodiment, the operation control unit 20 may be configured to display the input panel 1102 at the location such that the input panel 1102 is not overlapped with the first key thus specified (for example, the one-touch key thus pushed down), or the operation control unit 20 may be configured to display the text input screen 1703 or the input panel 1102 in the reduced size such that the text input screen 1703 or the input panel 1102 is not overlapped with the first key thus specified. Accordingly, it is possible to obtain the similar effect without reducing the information amount provided to the operator.

In the first and second embodiments described above, the operation control unit 20 may be realized only with hardware resources such as electrical circuits and the like. Alternatively, the operation control unit 20 may be realized with a combination of hardware resources and software. When the operation control unit 20 is realized with the combination of hardware resources and software, the operation control unit 20 is realized through executing, for example, a computer program with a computer. More specifically, a main storage unit retrieves the computer program stored in a recording medium such as an ROM (Read Only Memory) and the like, and a CPU (Central Processing Unit) executes the computer program to realize the operation control unit 20. The computer program may be provided in a stored form in a computer readable recording medium such as an optical disk and the like, or may be supplied through a communication network such as Internet.

It should be noted that the present invention is not limited to the first and second embodiments described above, and may be modified within a scope of the present invention. For example, the present invention is not limited to the facsimile, and may be applicable to other communication apparatus having a touch panel.

Further, in the first and second embodiments described above, the touch panel 10 is mounted with the resistor film method, and may be mounted with other method such as a capacitive film method. Further, the communication apparatus 1 includes the touch panel 10 as the display input unit, and may include other type of interface as the display input unit. Further, the display portion 11 and the input portion 12 are not necessarily formed in the physically integrated configuration.

The disclosure of Japanese Patent Application No. 2013-236377, filed on Nov. 15, 2013, is incorporated in the application.

While the invention has been explained with reference to the specific embodiments of the invention, the explanation is illustrative and the invention is limited only by the appended claims.

What is claimed is:

1. A communication apparatus comprising:
a display input unit having a display screen and an input unit for receiving an operation relative to the display screen;
a control unit configured to control the display input unit so that destination information of a transmission destination is obtained; and
a communication unit configured to transmit data to a destination specified with the destination information of the transmission destination thus obtained,
wherein said control unit is configured to control the display input unit to display a first key correlated to at least one letter specified in advance on the display screen,
said control unit is configured to control the display input unit to display a text input screen on the display screen so that the control unit receives an operation of inputting at least one letter relative to the text input screen when the control unit receives an operation of specifying the first key, and
said control unit is configured to obtain a text string formed of the at least one letter correlated to the first key thus specified and the at least one letter thus input as the destination information of the transmission destination.

2. The communication apparatus according to claim 1, wherein said control unit is configured to display the at least one letter correlated to the first key thus specified in a destination display region on the display screen when the control unit receives the operation of specifying the first key, and
said control unit is configured to display the at least one letter thus input in the destination display region when the control unit receives the operation of inputting the at least one letter.

3. The communication apparatus according to claim 2, wherein said control unit is configured to display the destination display region on the display screen when the control unit receives the operation of specifying the first key.

4. The communication apparatus according to claim 2, wherein said control unit is configured to obtain a text string displayed in the destination display region when the control unit receives a specific determination operation.

5. The communication apparatus according to claim 1, further comprising a storage unit,
wherein said control unit is configured to register the at least one letter correlated to the first key in the storage unit when the control unit receive an operation of setting the at least one letter correlated to the first key, and
said control unit is configured to use the at least one letter correlated to the first key registered in the storage unit when as the at least one letter correlated to the first key.

6. The communication apparatus according to claim 1, further comprising a plurality of first keys.

7. The communication apparatus according to claim 6, wherein said control unit is configured to control the display input unit to display the text input screen on the display screen when the control unit receives an operation of specifying one of the first keys arranged in a screen, and said control unit is configured to reduce a size of the screen so that the text input screen is not overlapped with the screen.

8. The communication apparatus according to claim 1, wherein said control unit is configured to control the display input unit to display at least one second key correlated to the destination information set in advance in addition to the first key, and said control unit is configured to obtain the destination information correlated to the at least one second key as the destination information of the transmission destination when the control unit receives an operation of specifying the at least one second key.

9. The communication apparatus according to claim 8, wherein said control unit is configured to control the display input unit to display the text input screen on the display screen overlapping the at least one second key so that at least a part of the at least one second key becomes visible.

10. The communication apparatus according to claim 1, wherein said control unit is configured to control the display input unit to display the text input screen on the display screen overlapping the first key so that at least a part of the first key becomes visible.

11. The communication apparatus according to claim 1, wherein said control unit is configured to control the display input unit to display the text input screen on the display screen so that the text input screen is not overlapped with the first key.

12. The communication apparatus according to claim 1, wherein said control unit is configured to receive an operation of setting a display location of the text input screen so that the control unit displays the text input screen at the display location.

13. The communication apparatus according to claim 1, wherein said control unit is configured to obtain the text string including a telephone number.

14. The communication apparatus according to claim 1, wherein said control unit is configured to control the display input unit to display the text input screen including a ten-key screen having a plurality of number keys for inputting a number.

15. The communication apparatus according to claim 1, wherein said display input unit includes a touch panel.

16. A method of controlling a display input unit having a display screen and an input unit for receiving an operation relative to the display screen so that destination information of a transmission destination is obtained, comprising the steps of:

displaying a first key correlated to at least one letter specified in advance on the display screen, displaying a text input screen on the display screen when an operation of specifying the first key is received, inputting at least one letter relative to the text input screen, and obtaining a text string formed of the at least one letter correlated to the first key thus specified and the at least one letter thus input as the destination information of the transmission destination.

17. A non-transitory computer readable medium storing a program for controlling a display input unit having a display screen and an input unit for receiving an operation relative to the display screen so that destination information of a transmission destination is obtained, wherein said program is executed with a processor to perform the steps of:

displaying a first key correlated to at least one letter specified in advance on the display screen, displaying a text input screen on the display screen when an operation of specifying the first key is received, inputting at least one letter relative to the text input screen, and obtaining a text string formed of the at least one letter correlated to the first key thus specified and the at least one letter thus input as the destination information of the transmission destination.

\* \* \* \* \*